(12) United States Patent
Thirumalai

(10) Patent No.: US 11,770,535 B2
(45) Date of Patent: Sep. 26, 2023

(54) SYSTEMS AND METHODS FOR JOINT COLOR CHANNEL ENTROPY ENCODING WITH POSITIVE RECONSTRUCTION ERROR

(71) Applicant: Samsung Display Co., Ltd., Yongin-si (KR)

(72) Inventor: Vijayaraghavan Thirumalai, Fremont, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 43 days.

(21) Appl. No.: 17/341,294

(22) Filed: Jun. 7, 2021

(65) Prior Publication Data
US 2022/0272344 A1    Aug. 25, 2022

Related U.S. Application Data

(60) Provisional application No. 63/151,344, filed on Feb. 19, 2021.

(51) Int. Cl.
*H04N 19/13* (2014.01)
*H04N 19/124* (2014.01)
*H04N 19/186* (2014.01)

(52) U.S. Cl.
CPC .......... *H04N 19/13* (2014.11); *H04N 19/124* (2014.11); *H04N 19/186* (2014.11)

(58) Field of Classification Search
CPC .... H04N 19/13; H04N 19/124; H04N 19/186; H04N 19/91
See application file for complete search history.

(56) References Cited

U.S. PATENT DOCUMENTS

| | | | | |
|---|---|---|---|---|
| 4,467,346 A | * | 8/1984 | Mori | H04N 1/648 |
| | | | | 348/391.1 |
| 5,323,187 A | * | 6/1994 | Park | H04N 19/14 |
| | | | | 375/E7.184 |
| 6,292,589 B1 | * | 9/2001 | Chow | H04N 19/176 |
| | | | | 382/250 |
| 6,504,494 B1 | | 1/2003 | Dyas et al. | |
| 6,788,811 B1 | * | 9/2004 | Matsuura | H04N 11/044 |
| | | | | 348/438.1 |
| 11,032,546 B1 | * | 6/2021 | Krishnan | H04N 19/124 |

(Continued)

OTHER PUBLICATIONS

European Search Report for EP Application No. 22157429.6 dated Jul. 18, 2022, 12 pages.

(Continued)

*Primary Examiner* — Joseph Suh
(74) *Attorney, Agent, or Firm* — Lewis Roca Rothgerber Christie LLP

(57) ABSTRACT

A method includes receiving an image frame comprising pixels, wherein each pixel comprises n color channels, generating, by a separate color channel quantization branch for each of the n color channels configured to guarantee a non-negative reconstruction error, a first sample set of quantized indices based on color values of residues for a first particular pixel in the image frame, wherein the first sample set corresponds to a first n-tuple, and generating, by an entropy encoder, an entropy encoding for the first particular pixel based on data that maps indices to n-tuples of quantized indices, wherein the first n-tuple is mapped to a first index.

20 Claims, 19 Drawing Sheets

(56) References Cited

U.S. PATENT DOCUMENTS

| | | | |
|---|---|---|---|
| 11,083,371 B1* | 8/2021 | Szabados | A61B 5/259 |
| 2001/0024529 A1* | 9/2001 | Chao | H04N 19/61 |
| | | | 375/E7.046 |
| 2005/0237359 A1* | 10/2005 | Yoshida | H04N 1/52 |
| | | | 347/43 |
| 2009/0097760 A1* | 4/2009 | Bezryadin | G06T 11/001 |
| | | | 382/232 |
| 2009/0297054 A1* | 12/2009 | Regunathan | H04N 19/60 |
| | | | 382/250 |
| 2009/0324063 A1* | 12/2009 | Murase | H04N 1/624 |
| | | | 382/163 |
| 2012/0147971 A1* | 6/2012 | Chien | H04N 19/91 |
| | | | 375/240.23 |
| 2013/0177079 A1* | 7/2013 | Kim | H04N 19/593 |
| | | | 375/240.12 |
| 2014/0198846 A1* | 7/2014 | Guo | H04N 19/59 |
| | | | 375/240.12 |
| 2014/0241630 A1* | 8/2014 | MacInnis | H04N 19/103 |
| | | | 382/166 |
| 2016/0014407 A1* | 1/2016 | Pu | H04N 19/176 |
| | | | 375/240.16 |
| 2016/0227217 A1* | 8/2016 | Karczewicz | H04N 19/70 |
| 2016/0269755 A1 | 9/2016 | MacInnis et al. | |
| 2016/0283777 A1* | 9/2016 | Holden | G06V 40/33 |
| 2017/0105012 A1 | 4/2017 | Wu et al. | |
| 2018/0020241 A1* | 1/2018 | Li | H04N 19/18 |
| 2018/0048901 A1* | 2/2018 | Zhang | H04N 19/124 |
| 2019/0114805 A1* | 4/2019 | Vosoughi | G06V 40/103 |
| 2019/0215519 A1* | 7/2019 | Huang | H04N 19/152 |
| 2020/0036979 A1 | 1/2020 | Thirumalai | |
| 2020/0050943 A1* | 2/2020 | Ishii | G06N 20/20 |
| 2020/0077122 A1* | 3/2020 | Alakuijala | H04N 19/44 |
| 2020/0266828 A1* | 8/2020 | Yoneya | H03M 7/3026 |
| 2021/0133322 A1* | 5/2021 | Healy | G06V 10/75 |
| 2021/0158586 A1* | 5/2021 | Castellucci | G06T 11/60 |
| 2021/0203985 A1* | 7/2021 | Nalci | H04N 19/11 |
| 2021/0218967 A1* | 7/2021 | Ray | H04N 19/463 |
| 2022/0028158 A1* | 1/2022 | Stengel | H04L 67/131 |
| 2022/0094951 A1* | 3/2022 | Gao | H04N 19/136 |

OTHER PUBLICATIONS

Forchhammer, et al. "Document and Image Compression, Chapter 5: Lossless Image Coding," retrieved from http://www.engnetbase.com on Mar. 18, 2009, pp. 113-143.

VESA, "VESA Display Stream Compression (DSC) Standard, v1.2", Jan. 20, 2016, 146 pages.

* cited by examiner

| e | e' |
|---|---|
| $[-\delta, 0]$ | 0 |
| $[1, \delta+1]$ | $\delta+1$ |
| $[\delta+2, 2\delta+2]$ | $2\delta+2$ |
| $[2\delta+3, 3\delta+3]$ | $3\delta+3$ |

| e | Band size | e' |
|---|---|---|
| [−2,0] | 2 | 0 |
| [1,3] | 2 | 3 |
| [4,6] | 2 | 6 |
| [7,9] | 2 | 9 |

Quantization error bounded by 2

FIG. 5C

| e | Band size | e' |
|---|---|---|
| [−2,0] | 2 | 0 |
| [1,3] | 2 | 3 |
| [4,5] | 1 | 5 |
| [6,7] | 1 | 7 |

Quantization error bounded by 1

FIG. 5D

| (R,G,B) Triple | Val |
|---|---|
| (0, 0, 0) | 0 |
| (4, 4, 4) | 124 |
| (1, 1, 1) | 31 |
| (4, 4, 0) | 120 |
| ... | ... |

FIG. 9

| Entropy Encoded Index | Val |
|---|---|
| 0 | 0 |
| 1 | 124 |
| 2 | 31 |
| 3 | 120 |
| 4 | 1 |
| 5 | 5 |
| 6 | 20 |
| ... | ... |
| 122 | 52 |
| 123 | 72 |
| 124 | 112 |

FIG. 10

| Val | Entropy Encoded Index |
|---|---|
| 0 | 0 |
| 1 | 4 |
| 2 | 72 |
| 3 | 36 |
| 4 | 7 |
| 5 | 5 |
| ... | ... |
| 31 | 2 |
| ... | ... |
| 124 | 1 |

FIG. 11

| Entropy Encoded Index *range* | Prefix | Suffix (length) |
|---|---|---|
| 0 | 0 | 00 |
| 1 | 0 | 01 |
| 2 | 0 | 10 |
| 3 | 0 | 11 |
| [4, 11] | 10 | xxx (3) |
| [12, 27] | 110 | xxxx (4) |
| [28, 59] | 1110 | xxxxx (5) |
| [60, 123] | 11110 | xxxxxx (6) |
| [124, 251] | 111110 | xxxxxxx (7) |
| [252, 507] | 1111110 | xxxxxxxx (8) |
| [508, 511] | 1111111 | xxxxxxxxx (9) |

FIG. 12

| Entropy Encoded $index_g$ | Prefix | Suffix (length) |
|---|---|---|
| 0 | 0 | - |
| 2-8 | 10 | xxx (3) |
| 9-16 | 110 | xxx (3) |
| 17-24 | 1110 | xxx (3) |
| 25-32 | 11110 | xxx (3) |
| 33-40 | 111110 | xxx (3) |
| 41-48 | 1111110 | xxx (3) |
| 49-56 | 11111110 | xxx (3) |
| 57-63 | 11111111 | xxx (3) |

| Entropy Encoded $index_{rb}$ | Prefix | Suffix (length) |
|---|---|---|
| 0 | 0 | 0 (1) |
| 1 | 0 | 1 (1) |
| 2-5 | 10 | xx (2) |
| 6-9 | 110 | xx (2) |
| 10-13 | 1110 | xx (2) |
| 14-21 | 11110 | xxx (3) |
| 22-37 | 111110 | xxxx (4) |
| 38-63 | 111111 | xxxxx (5) |

FIG. 13

SYSTEMS AND METHODS FOR JOINT COLOR CHANNEL ENTROPY ENCODING WITH POSITIVE RECONSTRUCTION ERROR

CROSS-REFERENCE TO RELATED APPLICATION(S)

This application claims priority to U.S. Provisional Patent Application No. 63/151,344 filed on Feb. 19, 2021, which is incorporated herein by reference in its entirety.

FIELD

The present application relates to image processing systems and methods. More particularly, it relates to systems and methods for joint color channel entropy encoding with positive reconstruction error.

BACKGROUND

Flat-panel displays, such as liquid crystal displays (LCDs) and light emitting diode (LED) displays, are becoming ubiquitous, due to their small size, superior image quality, and lower power consumption.

Pixels in a display panel have a particular response time. The data provided to a pixel to display may change faster than the pixel has the ability to respond. As such, undesirable effects such as motion blur or ghosting effects may occur. In order to make the displayed image more pleasing, image compensation technology is necessary. An overdrive algorithm has been developed that may compensate image data so as to reduce motion blur exhibited by the display pixels.

The above information disclosed in this Background section is only for enhancement of understanding of the present disclosure, and therefore it may contain information that does not form the prior art that is already known to a person of ordinary skill in the art.

SUMMARY

According to an embodiment, a method for encoding is described. The method may include: receiving an image frame including pixels, wherein each pixel include n color channels; generating, by a separate color channel quantization branch for each of the n color channels configured to guarantee a non-negative reconstruction error, a first sample set of quantized indices based on color values of residues for a first particular pixel in the image frame, wherein the first sample set corresponds to a first n-tuple; and generating, by an entropy encoder, an entropy encoding for the first particular pixel based on data that maps n-tuples of quantized indices to entropy encoding indices, wherein the first n-tuple is mapped to a first entropy encoding index.

The generating the first sample set of quantized indices may include computing the residue by each color channel quantization branch by subtracting a prediction based on a previous reconstructed pixel from the received image frame.

The generating the first sample set of quantized indices may further include quantizing, by a quantizer corresponding to each color channel quantization branch for the computed residue corresponding to the same color channel quantization branch to generate quantized indices.

Each n-tuple of quantized indices may be associated with a frequency of occurrence of the corresponding n-tuple in a set of quantized training images, and each n-tuple may include quantized color indices for the n color channels, wherein n is greater than 1.

The method may further include: generating, by the separate color channel quantization branches, a second sample set of quantized indices based on color values of residues for a second particular pixel in the image frame, wherein the second sample set corresponds to a second n-tuple; and generating, by the entropy encoder, an entropy encoding for the second particular pixel based on the data, wherein the second n-tuple is mapped to a second entropy encoding index.

The second particular pixel may be a neighboring pixel relative to the first particular pixel in the image frame.

The entropy encoding may include an Exponential-Golomb encoding, a Golomb-Rice encoding, a Huffman encoding, or a combination of Exponential-Golomb and Golomb-Rice encoding.

The data may be stored as an array.

The generating the entropy encoding may further include: computing a first pattern value based on the first n-tuple; searching the array including the data for the computed first pattern value to determine the corresponding first entropy encoding index; and encoding the first entropy encoding index.

The generating the entropy encoding may further include: computing a first pattern value based on the first n-tuple; retrieving, from the array, the first entropy encoding index from a position of the array indicated by the first pattern value; and encoding the first entropy encoding index.

The data that maps the n-tuples of quantized indices to entropy encoding indices may be generated by: receiving a first training image frame; computing a training reconstruction error value corresponding to the first training image frame; generating quantized indices based on the computed training reconstruction error value, wherein the reconstruction error value includes the n-tuples of quantized indices; identifying a frequency of occurrence of the n-tuples of quantized indices; and assigning an entropy encoding index to each of the n-tuples of quantized indices based on the frequency of occurrence of the n-tuples of quantized indices.

The method may further include sorting the n-tuples of quantized indices according to the frequency of occurrence.

The data that maps the n-tuples of quantized indices to entropy encoding indices may be performed during an offline process.

According to another embodiment, an encoder is described. The encoder may include: n separate color channel quantization branches configured to generate n-tuples of quantized indices, each branch corresponding to one of n color channels of a pixel of an image frame; an entropy encoder configured to receive the n-tuples of quantized indices and configured to entropy encode the n-tuples of quantized indices based on data that maps the n-tuples of the quantized indices to entropy encoding indices; wherein each of the n color channel quantization branches are configured to guarantee a non-negative reconstruction error, wherein n is greater than 1.

Each n-tuple of quantized indices may be associated with a frequency of occurrence of a corresponding n-tuple in a set of quantized training images.

Each n-tuple may include quantized indices for the n color channels.

According to another embodiment, an image compression and storage system, is described. The system may include: a memory storing computer-executable instructions; and a processor configured to execute the instructions and causes the system to perform operations including: receiving an image frame including pixels, wherein each pixel includes n color channels; generating, by a separate color channel quantization branch for each of the n color channels configured to guarantee a non-negative reconstruction error, a first sample set of quantized indices based on color values of residues for a first particular pixel in the image frame, wherein the first sample set corresponds to a first n-tuple; generating, by an entropy encoder, an entropy encoding for the first particular pixel based on data that maps n-tuples of quantized indices to entropy encoding indices, wherein the first n-tuple is mapped to a first entropy encoding index; wherein each n-tuple of quantized indices is associated with a frequency of occurrence of the corresponding n-tuple in a set of quantized training images; and wherein each n-tuple includes quantized indices for the n color channels, wherein n is greater than 1.

The instructions may further cause the system to perform operations including: generating, by the separate color channel quantization branches, a second sample set of quantized indices based on color values of residues for a second particular pixel in the image frame, wherein the second sample set corresponds to a second n-tuple; and generating, by the entropy encoder, an entropy encoding for the second particular pixel based on the data, wherein the second n-tuple is mapped to a second entropy encoding index.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 5C and 5D respectively illustrate uniform and non-uniform quantization tables utilized by the quantizer, according to an embodiment of the present disclosure.

FIG. 9 is a table illustrating numerical examples of triplet color values and their corresponding pattern values, according to an embodiment of the present disclosure.

FIG. 10 is a table illustrating numerical examples of a look up table, according to an embodiment of the present disclosure.

FIG. 11 is a table illustrating numerical examples of another look up table, according to an embodiment of the present disclosure.

FIG. 12 is a table illustrating numerical examples of a codebook stored in a look up table, according to an embodiment of the present disclosure.

FIG. 13 is a table illustrating numerical examples of another codebook stored in a look up table for a pixel having an RGBG format, according to an embodiment of the present disclosure.

Figure 1:
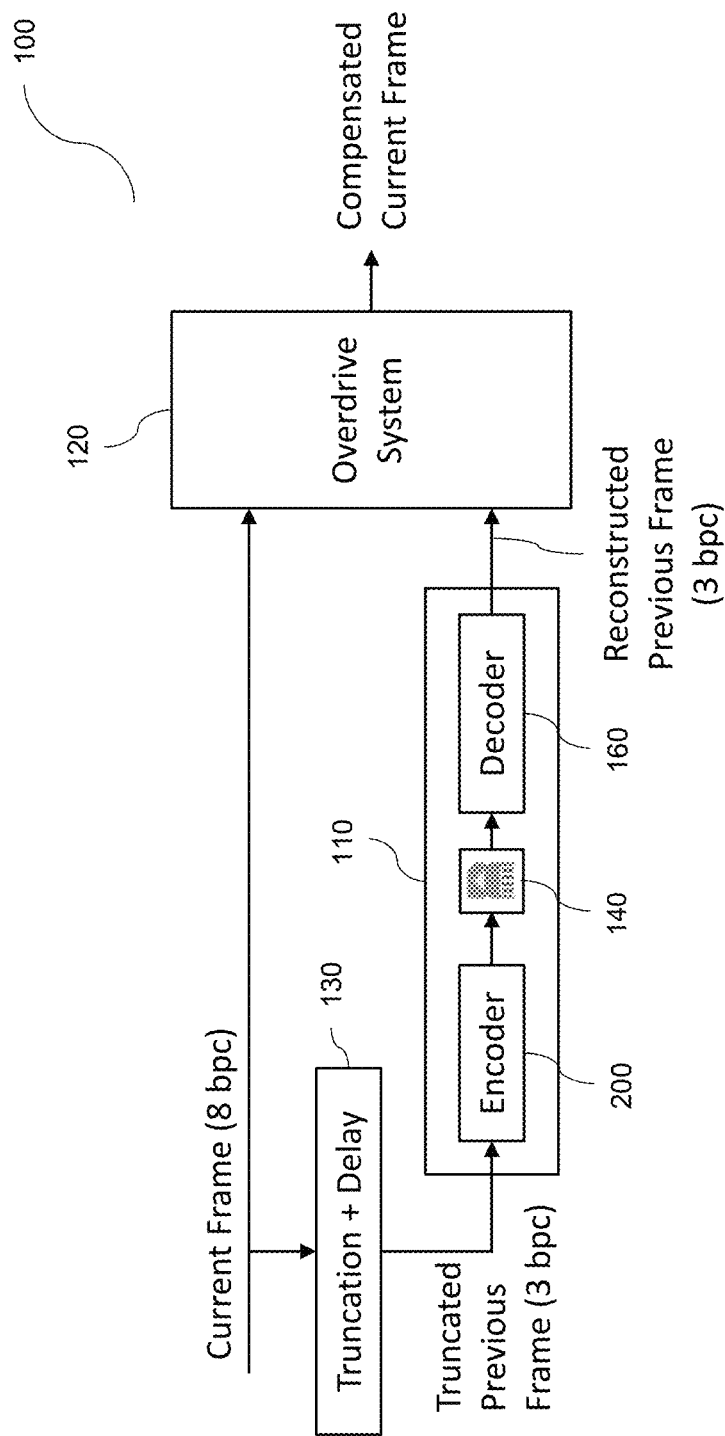
FIG. 1 is a schematic diagram of a frame compensation system utilizing an image compression and storage system, according to an embodiment of the present disclosure.

Embodiments of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

Hereinafter, example embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

FIG. 1 is a schematic diagram of a frame compensation system 100 utilizing an image compression and storage system 110, according to an embodiment of the present disclosure.

In some embodiments, the image compression and storage system 110 includes an encoder 200 for encoding (e.g., compressing) data to reduce its size, a storage medium 140 for storing the encoded data, and a decoder 160 for decoding (e.g., decompressing) the stored data to reconstruct the data. Storage of certain data, such as 4K image frames, consumes a large amount of memory space. Here, the encoder 200 and decoder 160 allow for the use of a smaller storage medium 140, which can result in space and cost savings.

As illustrated in FIG. 1, in some examples, the image compression and storage system 110 may form part of frame compensation system 100 in which an overdrive system 120 compensates the current frame (e.g., to reduce ghosting effect or blurring) using a previous frame. In some examples, a truncation and delay circuit 130 receives a frame (of, e.g., 8 bits per color (bpc)), truncates the frame (i.e., reduces the number of bpc of a pixel value of a frame, e.g., down to 3 bpc) and delays the frame to produce a truncated previous frame. The image compression and storage system 110 then compresses the previous frame and stores it for later consumption by the overdrive system 120. Here, the truncation and compression may make the stored frame significantly smaller in size than the original (previous) frame. For example, in the case of an RGB input frame, where each color value is represented with 8 bits (or 24 bits per pixel (bpp)), truncation may result in a frame representation of 3 bpc/9 bpp, and a 1.5:1 compression performed by the encoder 200 may further reduce this to 2 bpc/6 bpp. However, embodiments of the present disclosure are not limited to RGB input frames, and any suitable input frame format, such as RGBG (for PENTILE® sub-pixel arrangements), may be used. For example, in the case of an RGBG input frame, the truncation may reduce the frame size from 16 bpp to 6 bpp, and a 1.5:1 compression performed by the encoder 200 can further reduce the size down to 4 bpp. Furthermore, embodiments of the present disclosure are not limited to using the truncation operation above and, in some examples, the truncation and delay circuit 130 may be replaced with a delay block and the truncation operation may be omitted from the process described herein.

The performance of the overdrive system 120 may improve if the reconstruction error, that is, the error introduced by the image compression and storage system 110 is only non-negative (i.e., zero or positive). The coding schemes of the related art typically optimize the mean square error (MSE) or peak signal to noise ratio (PSNR), which means that the polarity of the error in the reconstructed image can be both positive and negative. According to some embodiments, the image compression and storage system 110 improves the performance of the overdrive system 120 relative to the related art by ensuring that the reconstruction error (introduced mainly due to quantization), which is defined as the difference between the reconstructed frame and the original frame, is always non-negative (i.e., greater than or equal to zero) and also is limited to a set maximum value.

Throughout the present disclosure, a frame refers to data of an image frame, which includes a plurality of pixels. Each pixel of the frame may be represented with a number of color values (e.g., red, green, and blue).

Figure 2:
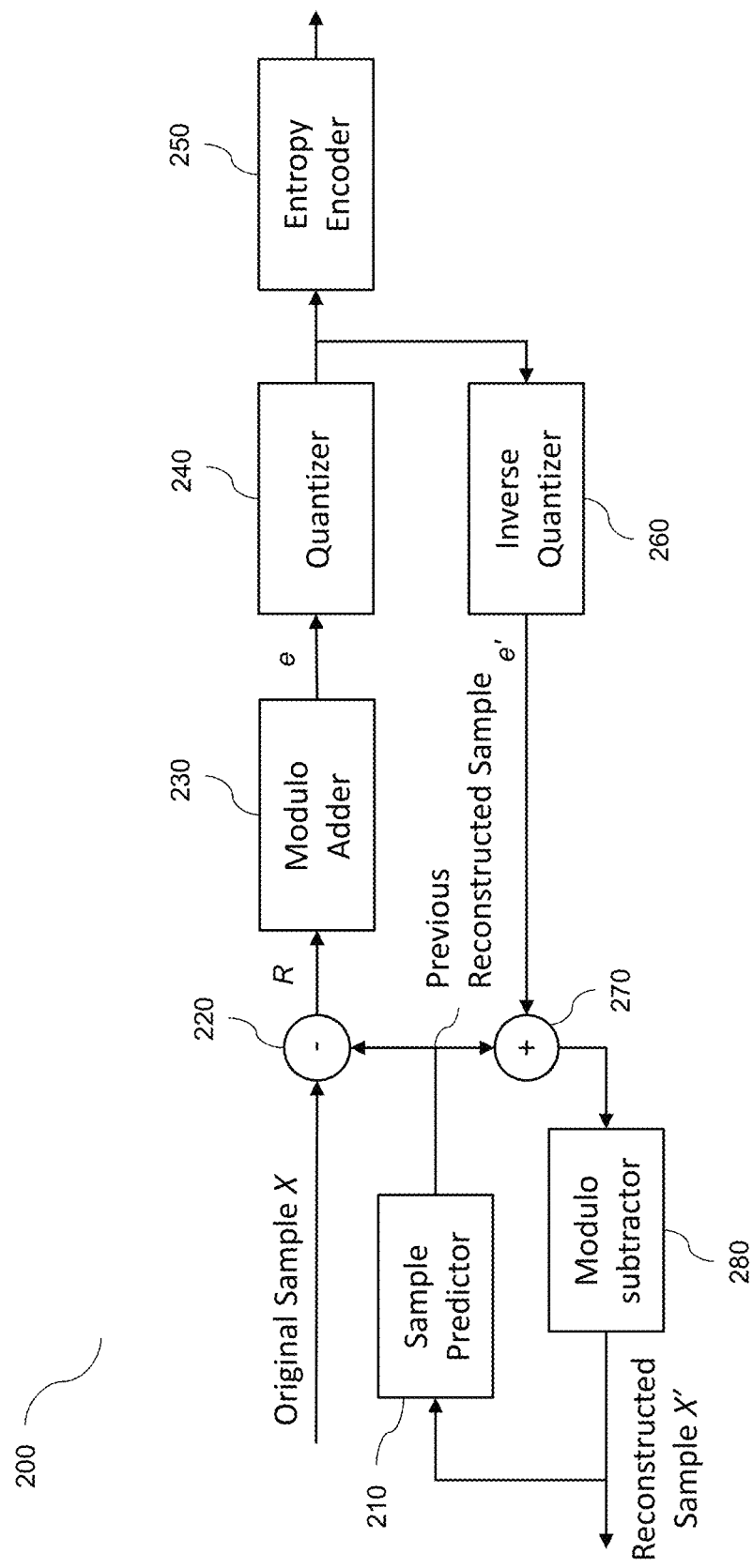
FIG. 2 is a schematic diagram of a positive error reconstruction encoder of the image compression and storage system, according to an embodiment of the present disclosure.

FIG. 2 is a schematic diagram of the encoder 200 of the image compression and storage system 110, according to an embodiment of the present disclosure. According to an embodiment, an original sample image frame X is provided to subtractor 220. A previous reconstructed sample image is also provided to the subtractor 220 where the difference between the original sample image and the previous reconstructed sample image is taken. The resulting error R is provided to an input of a modulo adder 230 to add a bias value. The output from the modulo adder 230 is then provided to an input of a quantizer 240 for quantization to generate a quantized index. The quantized index is provided to an entropy encoder 250 for coding, and the quantized index is also provided to an inverse quantizer 260 to generate a dequantized biased residue e'. The dequantized biased residue is provided to added 270, where it is combined with the previous reconstructed sample, and the resulting sum is provided to a modulo subtractor 280 to subtract the bias that was added by the modulo adder 230. The output from the modulo subtractor 280 is the reconstructed sample image frame X', and this is also provided to a sample predictor 210. Further details of each of these blocks will be described next in more detail.

Referring to FIG. 2, according to some embodiments, the encoder 200 utilizes a predictive coding scheme in which a residual of the original sample (e.g., a truncated frame) is encoded, and not the original sample itself. In some embodiments, the encoder 200 is configured to encode all color components (e.g., red, green, and blue color components in an RGB format) of the residual concurrently. The residual (also referred to as error R) is defined as the difference between the original sample and a prediction based on one or more neighboring samples. In some embodiments, the sample predictor 210 generates a predicted sample based on one or more of the already coded previous sample and the subtractor 220 calculates the residual value based on the original and predicted samples. In one example, the predicted sample is set equal to the previous reconstructed sample in the same row (i.e., in the horizontal direction). That is, if (i, j) is the current sample location, then (i−1, j) is the previous sample location. The calculated residue may be positive or negative value. The modulo adder 230 adds a bias value to the residue R to generate a biased residue e in order to reduce the signaling cost of 1-bit sign information. The quantizer 240 quantizes the biased residual value to generate a quantized biased value, and passes the corresponding quantization index to the entropy encoder 250 (e.g., Huffman, Exponential-Golomb entropy encoder). This compressed data (or encoded value) is stored in the storage medium 140.

In some embodiments, to generate the predicted sample, the inverse quantizer 260 performs the inverse operation performed by the quantizer 240 on the quantized biased residue to generate a dequantized biased residue, the adder 270 adds the predicted sample to the dequantized biased residue to generate a reconstructed biased sample, the modulo subtractor 280 subtracts the value added by the modulo adder 230 to generate a reconstructed sample. In some examples, a clipping function may be applied to the reconstructed sample to ensure that it is within a desired dynamic range, which may be expressed as $[0, 2^{bitDepth}-1]$ for a given bitdepth. This reconstructed sample (e.g., the clipped reconstructed sample) is used by the sample predictor 210 to predict the next sample.

In some embodiments, if the error in the residual space is maintained as non-negative, then the error in the signal space will also be non-negative. Therefore, the modulo adder 230 and the quantizer 240 are configured so that the error in the residual space remains positive and is bounded, which ensures the same in the signal space. In some embodiments, the quantizer 240 and inverse quantization 260 ensure a positive bounded error by appropriately adjusting quantization band size and reconstruction points in each band. Accordingly, the image compression and storage system 110 ensures that the reconstruction error (i.e., quantization error) is always non-negative.

Figure 3:
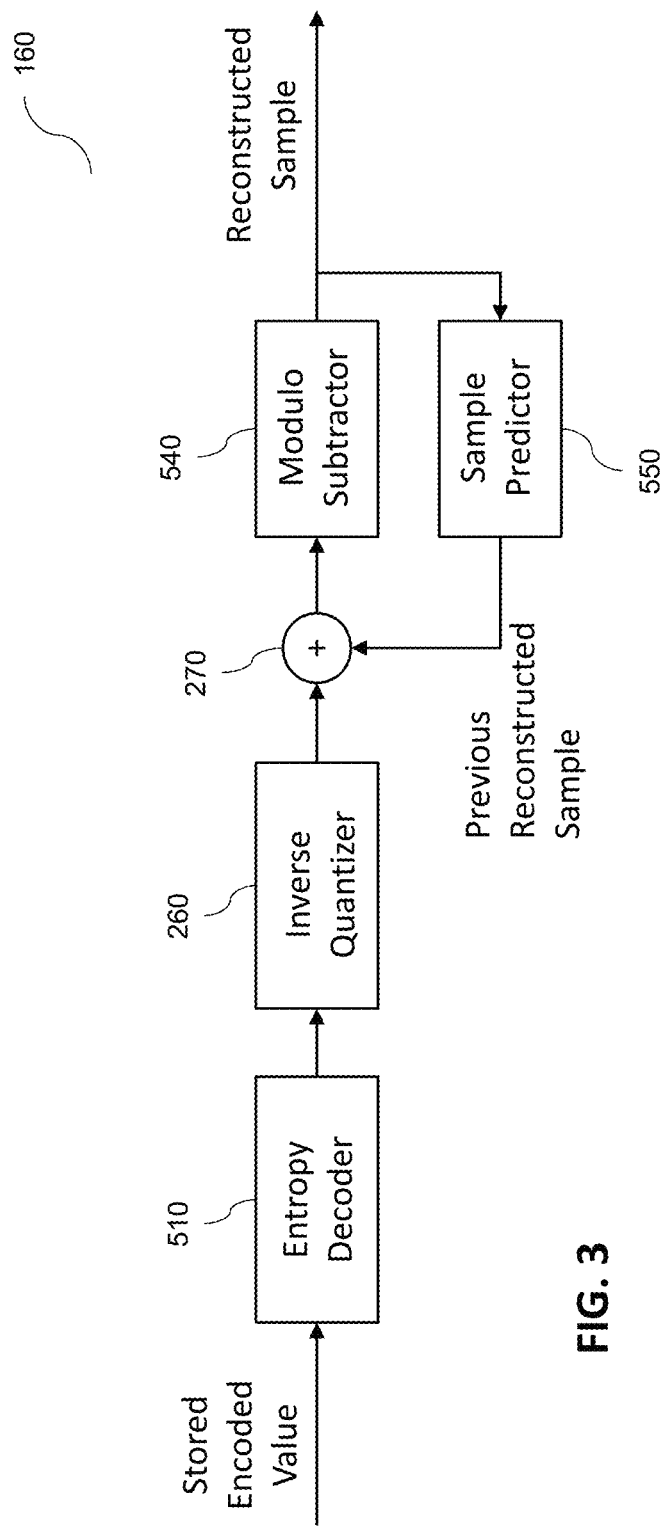
FIG. 3 is a schematic diagram of a decoder of the image compression and storage system, according to an embodiment of the present disclosure.

Referring to FIG. 3, in some embodiments, the decoder 160 includes an entropy decoder 510, which decompresses the stored sample received from the storage medium, and the same inverse quantizer 260, adder 270, modulo subtractor 280, and sample predictor 210 as described above. With the exception of the entropy decoder 510, the remaining components of the decoder 160 are same as those in the encoder 200 and configured in the same manner. As such, a detailed description thereof will not be repeated here for sake of brevity.

Because the decoder 160 does not have access to the original sample, and only the reconstructed sample, the sample predictor 210 of the decoder 160 uses the reconstructed sample to generate the prediction of the previous sample. Further, because the operations of the encoder 200 and decoder 160 mirror one another, the sample predictor 210 of the encoder 200 also uses the same reconstructed sample to generate the prediction of the previous sample so that the encoder 200 can be in-sync with the decoder 160, even though the encoder 200 does have access to the original sample.

In some embodiments, the encoder 200 and decoder 160 operate on a single color value of a pixel. Accordingly, a plurality of encoders 200 and decoders 160 may operate in parallel (e.g., operate concurrently/simultaneously) to process the various colors of a pixel, which will be described in more detail later.

Figure 4A:
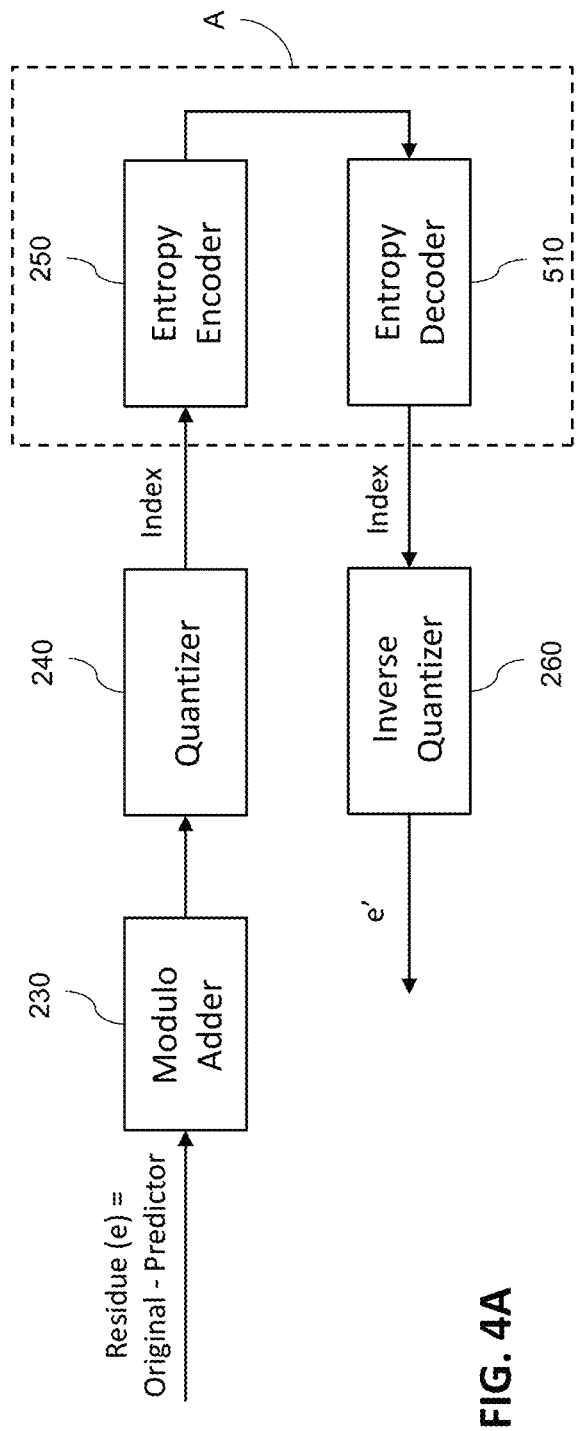
FIG. 4A is a schematic diagram illustrating a portion of the encoder together with a portion of the decoder, according to an embodiment of the present disclosure.
Figure 4B:
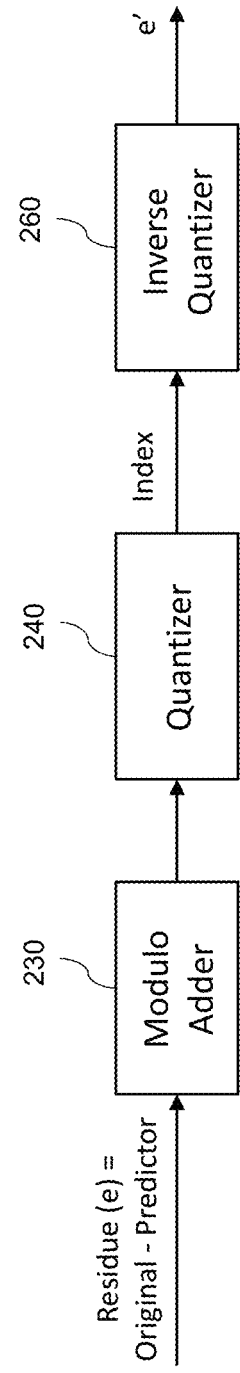
FIG. 4B is a simplified diagram of FIG. 4A, which accounts for the identity operation of the entropy coder and decoders, according to an embodiment of the present disclosure.

FIG. 4A is a schematic diagram illustrating a portion of the encoder 200 together with a portion of the decoder 160, according to some embodiments of the present disclosure. FIG. 4B is a simplified diagram of FIG. 4A, which accounts for the identity operation of the entropy coder and decoders, according to some embodiments of the present disclosure. According to some embodiments, the operations performed by the components of the encoder 200 and decoder 160, with the exception of the quantizer 240, are all loss-less operations. For example, the sequential operation of the entropy encoder 250 and entropy decoder 510 shown in FIG. 4A (as block A) is an identity operation, and can thus be effectively omitted, resulting in FIG. 4B. Therefore, the error in the signal space, which is defined as the difference between the reconstructed sample at the output of the decoder 160 and the original sample at the input of the encoder 200, is equivalent to the error in the residual space.

Therefore, if the error in the residual space is maintained as non-negative, the error in the signal space will also be non-negative. Further, if the error in the residual space is bounded, that is if $e'-e \leq \delta$, where $e'$ is the output of the inverse quantizer 260, e is the input to the quantizer 240, and where $\delta$ is a positive integer representing maximum allowable error, the error in the signal space will also be limited to $\delta$. This relation holds even in the presence of modulo adder 230 and modulo subtractor 280. In contrast, the transform coding used in the related art (e.g., high efficiency video coding (HEVC), JPEG-2000, or VESA display compression-M (VDC-M)) may not be suitable for ensuring the non-negative reconstruction error, as positive error in the transformed domain does not ensure non-negative reconstruction error in the signal space. This may be due to the fact that transforms such as the discrete cosine transform (DCT) preserve the L2-norm (or energy) between the original and transformation coefficients but not the L1-norm.

Accordingly, in some embodiments, the modulo adder 230 and the quantizer 240 are configured in such a way as to ensure that the error in the residual space remains non-negative and is bounded (i.e., limited to $\delta$), which ensures the same in the signal space.

The quantizer 240 and inverse quantization 260 ensure a non-negative, bounded error by appropriately adjusting quantization band size and reconstruction points in each band. In some embodiments, given a maximum allowable error $\delta$, the quantizer 240 utilizes uniform or non-uniform quantization bands having a maximum quantization step size of $\delta+1$, and uses a reconstruction point at the right edge (i.e., maximum value) of the band. Further, in some embodiments, the value zero is at the right edge of a band (e.g., the first quantization band of index 1) so that zero appears in the reconstructed value. This may be due to the fact that the residues are peaked at zero.

Figures 5A, 5B:
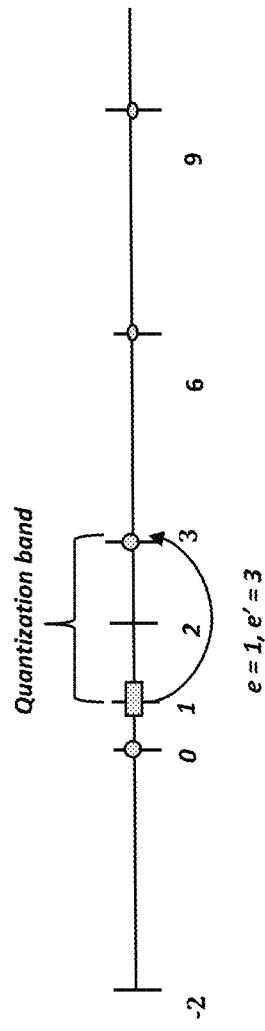
FIG. 5A illustrates a quantization table utilized by the quantizer, according to an embodiment of the present disclosure.
FIG. 5B illustrates the operation of the quantizer, according to an example of the present disclosure.

FIG. 5A illustrates a quantization table utilized by the quantizer 240 and inverse quantization 260, according to some embodiments of the present disclosure. FIG. 5B illustrates the operation of the quantizer 240 and inverse quantization 260, the input is e and output is e', according to some examples of the present disclosure. FIGS. 5C and 5D respectively illustrate uniform and non-uniform quantization tables utilized by the quantizer 240, according to some embodiments of the present disclosure.

Referring to FIG. 5A, the quantizer 240 uses uniform bands of quantization step size $\delta+1$ with reconstruction points at the right edge of each band. In some embodiments, the first quantization band has a right edge of zero (i.e., a reconstruction point of zero). Here, the biased residue e are integers. In some embodiments, when using the modulo addition and subtraction parameters defined in Equations 5 and 7 (also referred to as optimized modulo addition and subtraction parameters), the number of bands NB may be expressed as $$NB = \text{ceiling}\left(\frac{2^{bitdepth} + \delta}{\delta + 1}\right) \qquad \text{Eq. (1)}$$

where $\delta$ represents the maximum allowed error and Ceiling(.) represents a ceiling function. Here, $\delta+1$ may be the maximum allowable step size, i.e., smaller step sizes may be chosen. In some other embodiments, when using un-optimized modulo addition and subtraction parameters (i.e., parameters not defined by Equations 5 and 7), the number of bands NB may be expressed as $$NB = \text{ceiling}\left(\frac{2^{bitdepth} + 2\delta}{\delta + 1}\right) \qquad \text{Eq. (2)}$$

In some embodiments, in quantizing the biased residue, the quantizer 240 calculates a quantization index of the biased residue as:

$$I[e] = \text{Ceiling}\left(\frac{e}{\delta + 1}\right) \qquad \text{Eq. (3)}$$

where $-\delta \leq e \leq 2^{bitdepth}-1$, when using the optimized addition and subtraction parameters of Equations 5 and 7, where I[e] represents the quantization index, Ceiling(.) represents a ceiling function, e represents the biased residue, and $\delta$ represents the maximum allowed error.

Similarly, performing inverse quantization on the quantized biased residue may include calculating the dequantized biased residue as:

$$Q[e] = (\delta+1)I[e] \qquad \text{Eq. (4)}$$

where Q(e) represents the dequantized biased residue, I[e] represents the quantization index, and e represents the unquantized biased residue. Equations 3 and 4 apply to embodiments utilizing uniform quantization. When using non-uniform quantization, the maximum step size may be δ+1.

FIG. 5B illustrates an example in which δ=2, and the bit depth (i.e., the number of bits per color) is 3. Here, bit depth refers to the color information stored in an image and affects the dynamic range of the image. The higher the bit depth of an image, the more colors it can store. The simplest image, a 1 bit image, can only show two colors, black and white. That is because the 1 bit can only store one of two values, 0 (white) and 1 (black). As bit depth increases so does the dynamic range, which increases the number of quantization bands.

As illustrated in the example of FIG. 5B, a biased residue e of 1 results in a dequantized value of 3.

According to some embodiments, the modulo adder 230 calculates the biased residue e as:

$$e = \begin{cases} R & R \geq -\delta \\ R + 2^{bitdepth} + \delta & R < -\delta \end{cases} \quad \text{Eq. (5)}$$

This implies that the biased residue is within a range that can be expressed as:

$$-\delta \leq e \leq 2^{bitdepth} - 1 \quad \text{Eq. (6)}$$

The upper limit of the biased residue e allows for non-uniform quantization bands that can reduce error for certain biased values and thus improve performance.

For example, when δ=2, and bit depth=3, −2≤e≤7, and the uniform quantization table shown in FIG. 5C and the non-uniform quantization table shown in FIG. 5D can be utilized by the quantizer 240. In FIG. 5C, in which uniform band size of 2 is used, the quantization error for all of the four bands is bounded by δ (i.e., 2). However, embodiments of the present disclosure also allow for the non-uniform bands of the quantization table shown in FIG. 5D, in which the third and fourth bands have a smaller quantization error that is bounded by 1 (and not 2). In some example, the quantizer 240 reserves the narrower bands for those bands that are more statistically significant (e.g., bands in which more of the biased residues lie, or bands of values whose values have a greater impact on the performance of the overdrive system 120). As such, the smaller quantization error enabled by the operation of the modulo adder may improve the performance of the overdrive system 120.

It should be noted that for unoptimized parameters (e.g., parameters that are not optimized to reduce range of e), equation 5 may be modified to be:

$$e = \begin{cases} R & R \geq -\delta \\ R + 2^{bitdepth} + 2\delta & R < -\delta \end{cases}$$

for range $-\delta \leq e \leq 2^{bitdepth} - 1 + \delta$

The modulo subtractor 280 may perform the opposite operation as the modulo adder 230 (which adds a bias value to the residue R) by removing the bias value added to the residue by the modulo adder 230. According to some embodiments, for a given input x, the output y of the modulo subtractor 280 is expressed as:

$$y = \begin{cases} x & x \leq 2^{bitdepth} + \delta - 1 \\ x - \left(2^{bitdepth} + \delta\right) & x > 2^{bitdepth} + \delta - 1 \end{cases} \quad \text{Eq. (7)}$$

whereas the modulo adder 230 is expressed as:

$$e = \begin{cases} R & R \geq -\delta \\ R + 2^{bitdepth} + \delta & R < -\delta \end{cases}$$

As noted above, in some examples, a clipping function may be applied to the reconstructed sample to ensure that it is within a desired dynamic range, which may be expressed as $[0, 2^{bitDepth} - 1]$ for a given bitdepth. In the example of 8 bpc, the clipping function may limit the output of the subtractor to [0, 7].

Accordingly, as described above, through the use of appropriate quantization band size and added bias, the image compression and storage system 110 ensures (e.g., guarantees) non-negative and bounded error on the reconstructed images, which can improve the performance of the overdrive system 120.

It should be noted that for unoptimized parameters, equation 7 may be modified to:

$$y = \begin{cases} x & x \leq 2^{bitdepth} + \delta - 1 \\ x - \left(2^{bitdepth} + 2\delta\right) & x > 2^{bitdepth} + \delta - 1 \end{cases}$$

Figure 6:
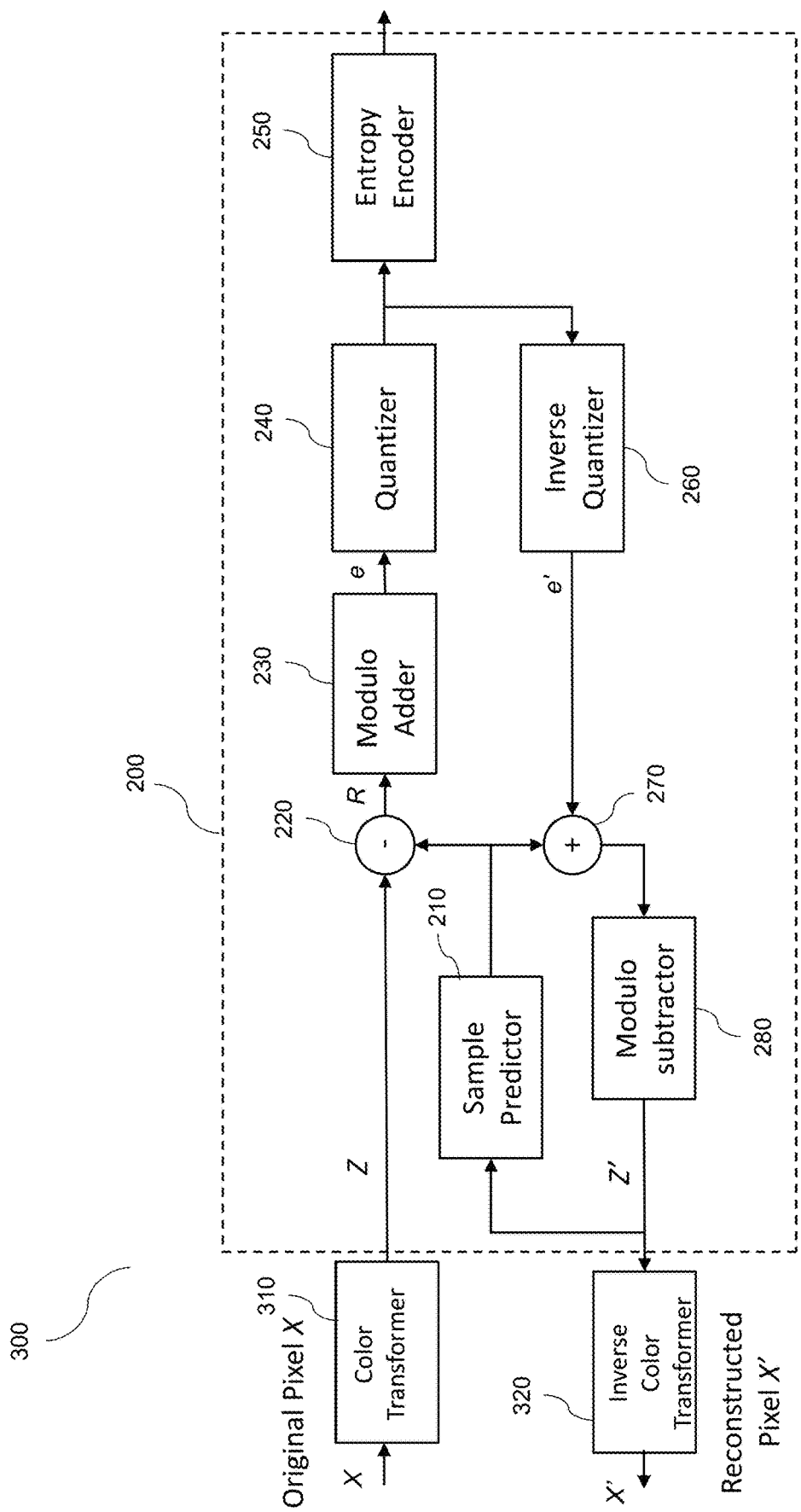
FIG. 6 is a schematic diagram of a color transform positive error reconstruction encoder of the image compression and storage system, according to an embodiment of the present disclosure.

FIG. 6 is a schematic diagram of a color transform positive error reconstruction encoder 300 that includes the encoder 200 of the image compression and storage system 110 illustrated in FIG. 2 with an additional color transform scheme, according to an embodiment of the present disclosure. The encoder 200 of the image compression and storage system 110 is identical to the encoder 200 that is described above with reference to FIG. 2 and will not be repeated here.

According to an embodiment, each pixel of the frame may be represented with a number of color values (e.g., red, green, and blue). Accordingly, each color value corresponds to a color channel of a pixel. For example, each color channel of the pixel may be represented by a color subpixel. In some embodiments, the color channels may be arranged in an RGB format that includes a red color channel, a green color channel, and a blue color channel. In other embodiments, the color channels may be arranged in an RGBG format (e.g., PENTILE® format) that also includes a red color channel, a green color channel, and blue color channel. Yet in other embodiments, other color channel arrangements may be envisaged by person skilled in the art. Accordingly, the image frame includes a correlation among the color channels in addition to spatial correlations. Accordingly, color transform may be performed to exploit such inter-channel correlations.

Referring to FIG. 6, a color transformer 310 and an inverse color transformer 320 are provided at the original pixel input and the reconstructed pixel output of the encoder 200. More in particular, the color transformer 310 takes an original pixel X (e.g., an original red, green, and blue color channels) and transforms this to some color transformed pixel value Z of the original image, which is then provided to the subtractor 220. For example, color transformer 310 may convert an original pixel X that is in RGB format to a color transformed pixel Z that is in a YCoCg format and the inverse color transformer 320 may do the inverse by converting a pixel from YCoCg format to RGB format. The subtractor 220 calculates the residual value based on the color transformed original and predicted samples as described earlier with reference to FIG. 2 and the modulo subtractor 280 generates a reconstructed sample Z'. In some embodiments, the reconstructed sample Z' is provided to inverse color transformer 320 to generate an inverse color transform X'. Accordingly, color transform may be used to exploit the inter-channel correlation together with the positive reconstruction error.

In some embodiments, as described earlier, because the error in the residual space (i.e., e'−e) is always maintained as a non-negative value (e.g., a positive value), the error in the signal space (i.e., Z'−Z) is also always maintained as a non-negative value. However, in the color transform scheme of FIG. 6, this positive value error is maintained only in the color transformed space (i.e., Z'−Z), but not in the image space (i.e., X'−X). In other words, even if a positive value error is maintained in the color transformed space, a positive value image error is not guaranteed in the image space. For example, assuming that color transformer 310 is an RGB-YCoCg transform where a forward color transform is represented by a 3×3 matrix T=[0.25 0.50 0.25; 0.50 0 −0.50; −0.25 0.50 −0.25], and original input X=[6 5 4], where R=6, G=5, B=5. Based on these assumptions, Z=T*X=[5 1 0]. Next, assuming that Z'=[6 2 1] according to the quantizer deign described in FIG. 2, an error of the color transformed image $Z_i'-Z_i \geq 0$, $\forall i=\{0,1,2\}$ is a positive value. By applying an inverse color transform by the inverse color transformer 320, X'=[7, 7, 3], which implies an image space error X'−X=[1, 2, −1], which includes a negative value, i.e., −1. Thus, while a positive value error was maintained in the residual space and the color transformed space, a positive value error was not carried over to the original image space. Accordingly, the embodiments of the present disclosure will describe techniques that guarantee a non-negative value error in the original image space while also exploiting color channel correlation. However, the described techniques should not be construed to being limited to only systems that generate a non-negative value error. Instead, the described techniques may also be applicable to systems that generate a negative value error.

Figure 7:
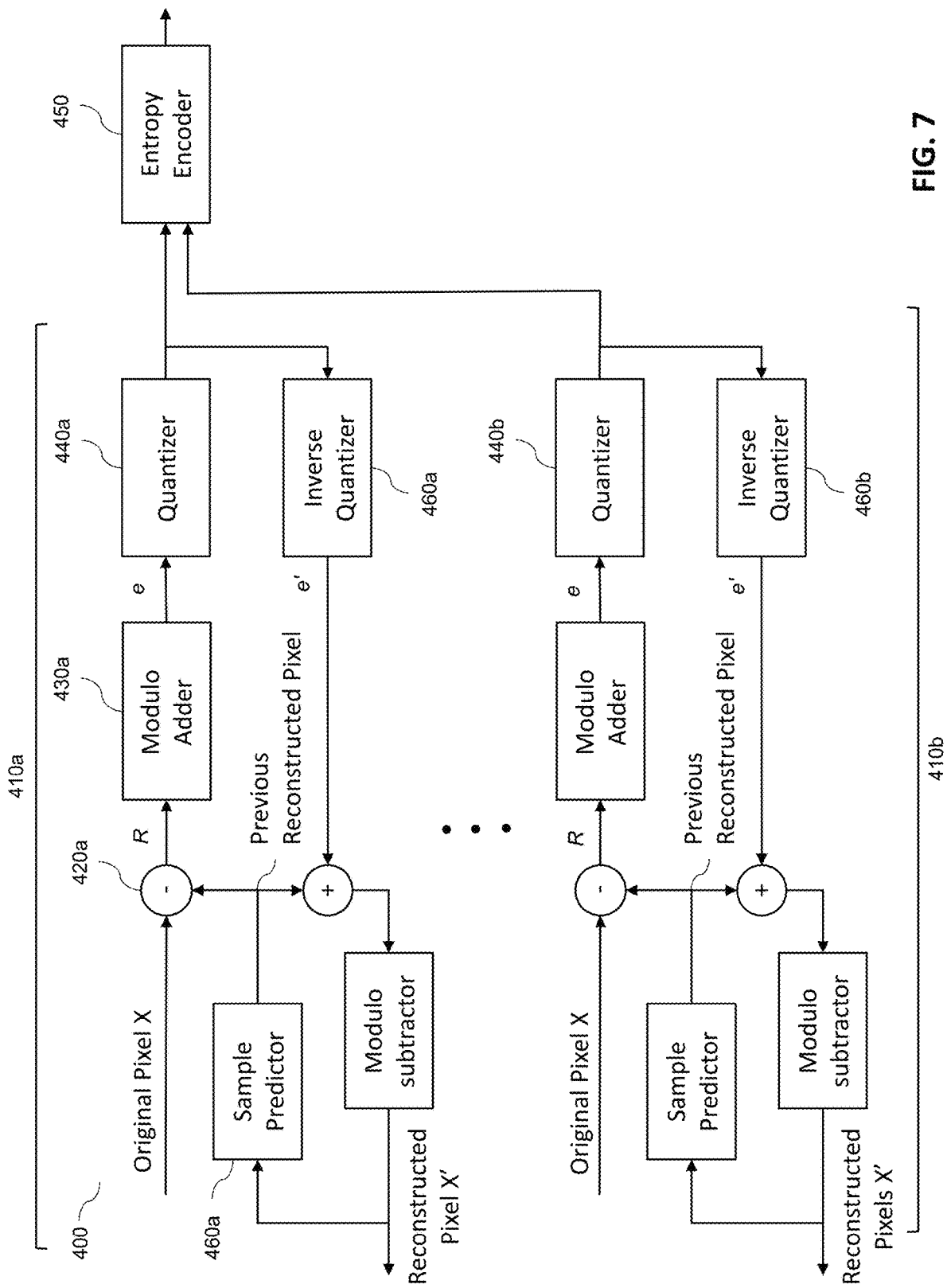
FIG. 7 is a schematic diagram of a joint color channel entropy encoding positive error reconstruction encoder of the image compression and storage system, according to an embodiment of the present disclosure.

FIG. 7 is a schematic diagram of a joint color channel entropy encoding positive reconstruction error encoder 400 of the image compression and storage system 110, according to an embodiment of the present disclosure.

Referring to FIG. 7, according to various embodiments, the encoder 400 utilizes a joint color channel entropy encoding scheme in which a quantized value from each color channel of the pixels is provided to an entropy encoder 450. In other words, according to an embodiment, a separate quantizer 440a, 440b is provided for each color channel, wherein the quantized output from each quantizer 440a, 440b are provided jointly as color channel inputs to the same entropy encoder 450. Accordingly, the illustrated example in FIG. 7 shows a red color channel quantization branch 410a for the red color channel and a green color channel quantization branch 410b for the green color channel, each feeding in to the same entropy encoder 450. In some embodiments, there can be n number of color channel quantization branches based on the pixel format, e.g., RGB format includes three color channels, in which case there would be three quantizers with each feeding in to the same entropy encoder; whereas another format that includes, for example, four color channels would have four quantizers with each feeding in to the same entropy encoder.

In more detail, according to some embodiments, the sample predictor 460a for the red channel generates a prediction of the red pixel from a previous image and the subtractor 420a calculates the residual value based on the original and predicted pixels. A green color channel quantization branch 410b may be configured in a similar fashion as the red color channel quantization branch 410a to generate a residual value of a green color channel value. Residual values of other channels (e.g., a green channel, a blue channel, etc.) are generated based on a similar process. In some embodiments, the original pixel X includes inter-channel correlation (e.g., there may be a relationship between the samples among the color channels. For example, a combination of channel values may occur with a particular frequency), and the inter-channel correlation is carried over to the residue space because differential pulse code modulation (DPCM) exploits only spatial correlation. The modulo adder 430a adds a bias value, which is a constant value. Residual values of other channels may be modified by modulo adders of corresponding encoders (e.g., encoder 410b) in a similar fashion. Because the modulo adder 430a (and modulo adders of other channels) adds a constant value to the residue, the inter-channel correlation again, remains unaffected by the modulo adder 430a. The quantizer 440a (and similar quantizers in other channels) also does not affect the inter-channel correlation of the residue because the quantizer 440a removes some of the lower bitplane value while preserving the most significant bits (MSBs). Therefore, inter-channel correlation between the quantized indices of each channel may be maintained. These quantized indices may be provided to a lossless encoder such as an entropy encoder 450. Because the lossless encoder is lossless, the non-negative reconstruction error may be maintained.

According to some embodiments of the present disclosure, a green color channel quantization branch 410b may be configured in a similar fashion as the red color channel quantization branch 410a to generate an inter-channel correlated quantized index, which may then be provided to the same entropy encoder 450 that is used by the red color channel quantization branch 410a. Furthermore, according to an embodiment, in the case of a pixel that is in an RGB format, a blue color channel quantization branch (not shown) may also be configured to provide an inter-channel correlated quantized index to the same entropy encoder 450. Accordingly, the entropy encoder 450 may take the inter-channel correlated quantized indices from the red color channel, the green color channel, and the blue color channel, and jointly encode the quantized indices in one shot to take advantage of the inter-channel correlation that is included in each of the quantized indices. Accordingly, by encoding all of the color channels together, the overall number of bits used to encode an image frame may be reduced, the details of which will be explained next.

In some embodiments, variable length binary code words may be used to save the amount of memory space needed to store encoded data, and the general format of the entropy coder is such that the most frequent pattern is assigned the shortest binary code word and the least frequent pattern is assigned the longest binary code word. Herein the present disclosure, a pattern refers to an n-tuple of values of quantized indices from different color channels, for example, an RGB triplet format, an RGBG quadruplet format, or RB/GG pairs or RG/BG pairs format, or other formats of the pixels. Thus, for example, if the pattern corresponding to the quantized indices (0, 0, 0) is the most frequent pattern, and (4, 4, 4) is the second most frequent pattern, then (0, 0, 0) may be assigned a corresponding binary code word "0," and (4, 4, 4) may be assigned a corresponding binary code word "10." On the other hand, if the pattern (3, 3, 2) is the least frequent pattern, then a longer binary code word, for example, "111111110" may be assigned to (3, 3, 2). While the binary code words for the less frequent patterns may be longer than the actual pattern itself, the bit savings achieved by the more frequent patterns lead to an overall bit savings. Accordingly, a binary code word "0" uses just 1-bit according to the joint coding technique whereas (0, 0, 0) uses 3-bits when each color is coded independently thus, saving bits in the case of the most frequent pattern. Because this is the most frequent pattern, the bit savings can add up to a substantial amount. Here, the pattern (0, 0, 0) represents a quantized index of 0 for the red color channel, 0 for the blue color channel, and 0 for the green color channel. Similarly, the pattern (4, 4, 4) represents a quantized index of 4 for the red color channel, 4 for the blue color channel, and 4 for the green color channel.

According to some embodiments, the joint color channel entropy coding technique includes first training the image compression and storage system 110 to generate a look up table (or other data structure) that includes information directed to a frequency of occurrence of certain patterns in the quantized indices. By collecting this information, a code word (e.g., a binary code word) can be generated and stored in the look up table, so that the code word may be used to reduce the number of bits used while encoding. In some embodiments, the training is performed offline, for example, when the image and compression system 110 is manufactured or programmed. Thus, once the training process is performed and the look up table is generated, the training process does not have to be performed again. Accordingly, the training process may be performed offline because it is not performed during the actual encoding process.

Figure 8:
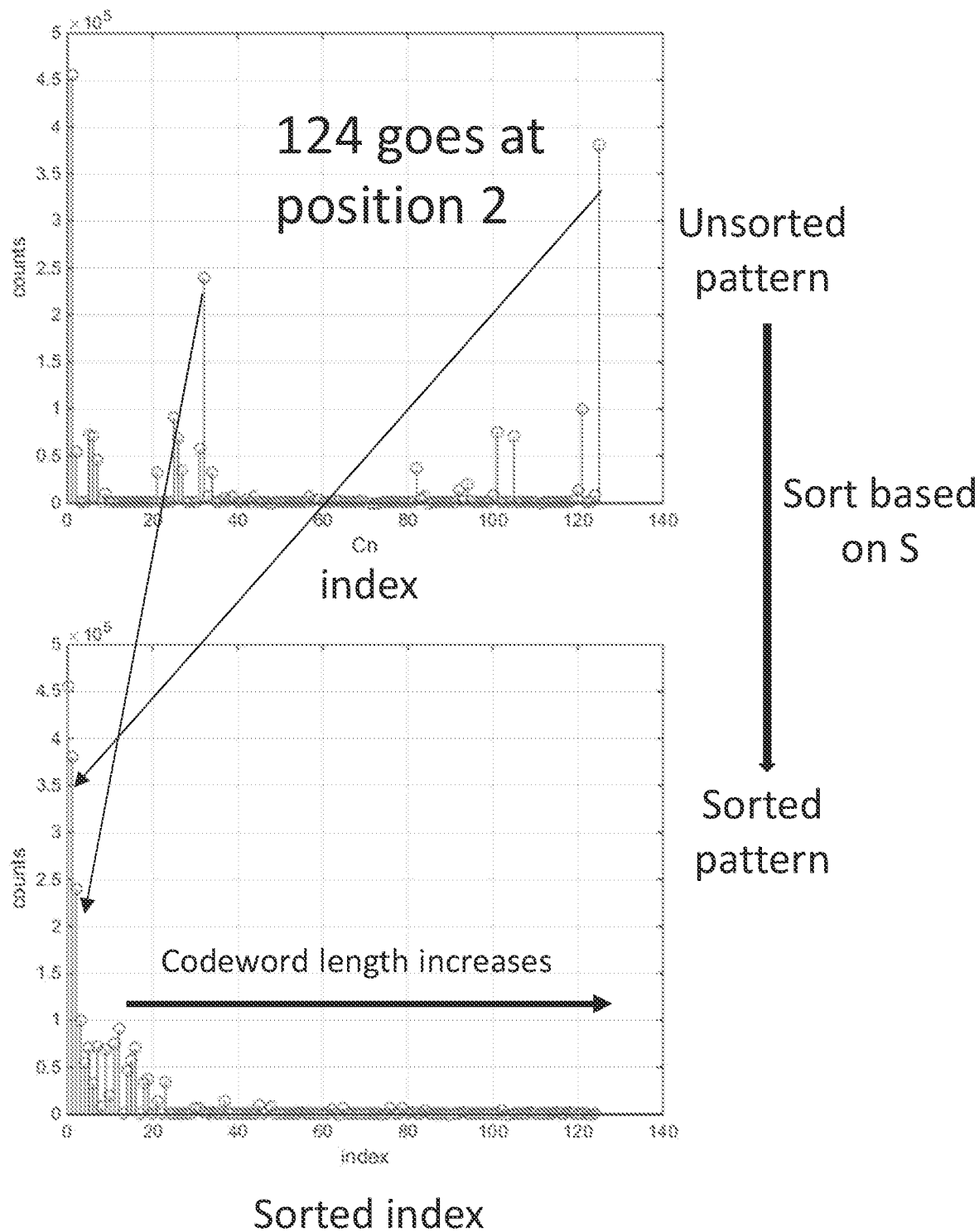
FIG. 8 is an example of an unsorted and a sorted histogram illustrating a frequency of occurrence of particular patterns in an image frame residue, according to an embodiment of the present disclosure.
Figure 9:
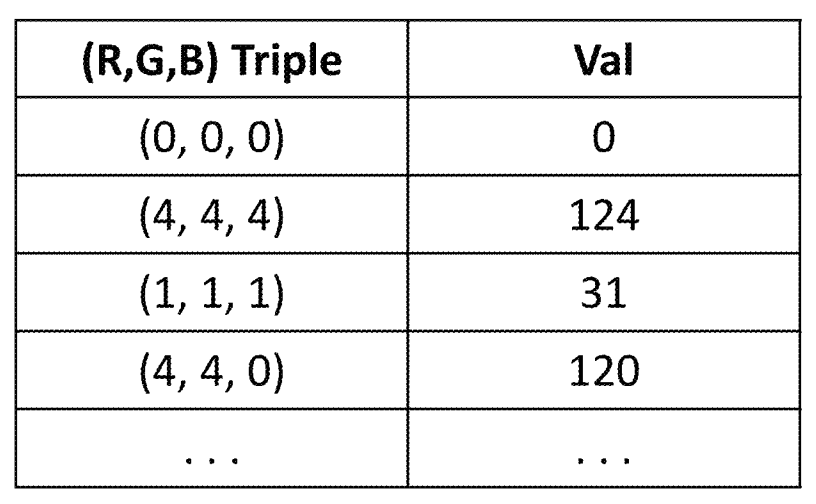

FIG. 8 is a histogram illustrating common patterns of quantized indices that may be learned from training images, and highlights the advantages of pattern learning and how a learned pattern database can be applied in a real-world scenario. In some embodiments, the training process may be performed by identifying how many times each pattern (of quantized indices) occurs in a training image. The histogram ($H_i$) of FIG. 8 shows counts of pattern occurrence in the training image. In the histogram, each point on the x-axis represents a pattern value (which will be explained later) of quantized indices and the y-axis represents the respective number of occurrences or probability for that pattern. The pattern values of quantized index patterns may be computed as val=$M^2$*Q[R]+M*Q[G]+Q[B], where M is the number of representative quantized indices for each color channel, Q[R] is the quantized index for the red color channel, Q[G] is the quantized index for the green color channel, and Q[B] is the quantized index for the blue color channel. Accordingly, if, for example, M=5, then val=25*Q[R]+5*Q[G]+Q[B]. FIG. 9 is a table illustrating quantized index patterns and associated values. For example, quantized index pattern (4, 4, 4) is shown to correspond to value 124 (e.g., (25*4)+(5*4)+4=124).

A sorted array S of pattern values may be generated, where values of the array S are sorted based on number of occurrences of the values in the training image. Thus, a first pattern value of S (e.g., S[0]) may correspond to a most frequently occurring pattern of quantized indices.

In some embodiments, the number of occurrences of each pattern value may correspond to an average of occurrences of the pattern value across a plurality of the training images. In some embodiments, the count of occurrences from each training image may be weighted equally (e.g., each training image is equally important) but in other embodiments, each of the training images may be weighted differently (e.g., because certain training images may be considered more important or more valuable than other training images). As such, the weights of the image may vary depending on the design parameters of the training process. Accordingly, the weighted average histogram may be computed as:

$$A_i = \left(\frac{1}{N}\right)\sum_i w_i * H_i$$

where, $w_i$ is the weight given to the $i^{th}$ training image and $H_i$ corresponds to a histogram of the $i^{th}$ training image. If the weights of the images are all the same, then $w_i$=1. On the other hand, if the weights are not the same, then the weights may be assigned to the training images based on the importance of each image such that the sum of weights is 1, i.e., $$\frac{1}{N}\sum_i w_i = 1.$$

Referring back to FIG. 9, the look up table may be sorted based on frequency of occurrence of each pattern. In the above example, the pattern (0, 0, 0) has the most frequent occurrence and therefore is sorted and placed in the first position (e.g., entropy encoding index 0). Pattern (4, 4, 4) has the second most frequent occurrence and therefore is sorted and placed in to the second position (e.g., entropy encoding index 1). This process may be repeated until all or most of the entropy encoding indices are sorted. Accordingly, a table such as the one illustrated in FIG. 9, where S={0, 124, 31, 120, 1, 5, 20, 4, 123, 25, 93, 100, 24, 90, 6, 30, 104, 115, 33, 81, 121, 91, 80, 26, 95, 34, 40, 15, 75, 21, 43, 32, 94, 9, 118, 45, 3, 119, 105, 101, 29, 23, 122, 16, 19, 8, 116, 41, 99, 35, 28, 76, 103, 46, 79, 92, 49, 106, 109, 65, 44, 18, 36, 78, 84, 56, 96, 108, 48, 117, 10, 50, 2, 42, 110, 98, 83, 85, 7, 38, 86, 37, 11, 22, 82, 55, 14, 27, 102, 51, 70, 54, 17, 68, 88, 13, 77, 114, 74, 66, 59, 87, 58, 71, 47, 53, 107, 69, 39, 62, 61, 111, 113, 89, 73, 57, 64, 97, 63, 60, 12, 67, 52, 72, 112} may be generated and stored as an array in a look up table. In some embodiments, other training methods may be used to generate similar look up tables or data structures.

The bottom half of FIG. 8 illustrates the histogram sorted based on the sorted array S. As shown, the pattern values are sorted from most frequently occurring to least frequently occurring. For example, entropy encoding index 0 in the histogram occurs most frequently and is already in the first position. The second most frequently occurring pattern in this example is entropy encoding index 124, so this is moved to the second position, as illustrated in the bottom graph of FIG. 8. The next most frequently occurring pattern is entropy encoding index 31 so that is moved to the third position. This process may be repeated for all or most of the indices to generate the sorted histogram.

Once the training process is complete and the look up table is generated, the entropy encoder 450 may then be used to perform joint color channel entropy encoding. In some embodiments, the pattern may be based on an n-tuple format such as, for example, an RGB triplet format, an RGBG quadruplet format, or RB/GG pairs or RG/BG pairs format, or any other format of the pixels. The example provided in the present disclosure will be described by using an RGB triplet format by way of example, but the same method may also be applicable to the other formats. The encoding process using the trained information that is stored in the look up table (or other data structure) will now be described. In the examples that follow, a sorted array S={0, 124, 31, 120, 1, 5, 20, . . . , 52, 72, 112} will be used by way of example to help explain the embodiments. In some embodiments, the quantized indices for the red, green, and blue color channels of the pixels are provided as inputs to the entropy encoder 450.

According to one encoding method, the look up table includes the sorted array S={0, 124, 31, 120, 1, 5, 20, ..., 52, 72, 112}. Here, the pattern values are sorted in the order from the most frequently occurring pattern to the least frequently occurring pattern, wherein the most frequently occurring pattern is entropy encoding index 0, the second most frequently occurring pattern is entropy encoding index 1, and so on. Based on this sorting, according to this example, val 0 corresponds to entropy encoding index 0, val 124 corresponds to entropy encoding index 1, val 31 corresponds to entropy encoding index 2, and so on, as illustrated in the example look up table in FIG. 10. Accordingly, for example, during encoding, if the quantized index is 124, then the encoder searches in the S array look up table for the value 124, then based on the location of 124 (which is the entropy encoding index corresponding to the second most frequently occurring value), the encoder knows that val 124 corresponds to entropy encoding index 1. This process may be repeated for every value pattern.

According to another method of encoding, a look up table idxArray such as the one illustrated in FIG. 11 may be generated based off of the sorted array S. idxArray may be an array of entropy encoding indices arranged based on corresponding pattern value, where the pattern values val are arranged in a numerical order. Therefore, the encoder does not have to search the idxArray for the pattern value number. Instead, the encoder merely looks up the pattern value in the idxArray and extracts the corresponding entropy encoding index, where index=idxArray[val]. For example, if the pattern value is 124, then the encoder, without searching, goes to location 124 and retrieves entropy encoding index 1 from the idxArray look up table. Accordingly, pre-calculation is performed to generate the idxArray look up table but a search does not have to be executed during the encoding process, thereby reducing the amount of computations that are performed when retrieving information from the idxArray look up table, thus saving time and saving resources. On the other hand, this method requires storing a look up table for the encoder and another look up table for the decoder. That is, the entropy encoding index array idxArray may be stored at the encoder and the array S may be stored at the decoder. On the other hand, the first encoding method does not require the idxArray look up table but has to execute computations to search the look up table. Therefore, a suitable encoding method may be selected based on design requirements.

Accordingly, the indices may be obtained from these look up tables, and entropy encoding may be performed on the index by the entropy encoder utilizing one or more known entropy encoding techniques such as, Exponential-Golomb, Golomb-Rice, or Huffman encoding techniques. Accordingly, the quantized indices from the three color channels may be jointly encoded by the entropy encoder.

In some embodiments, a decoder may be configured to decode the bits that were encoded by the encoder. More particularly, the decoder decodes the jointly encoded bitstreams to color separated quantized indices, Q[R], Q[G], and Q[B], which are then inverse quantized by an inverse quantizer 460a, 460b (see FIG. 7). Accordingly, the entropy encoding index value is matched to its corresponding pattern value val in the look up table to obtain the corresponding value, i.e., val=S[index]. Thus, referring back to the above example, the entropy encoding index value 1 in array S determines that the pattern value is 124, i.e., S[1]=124, and an entropy encoding index value 2 is 31, and so on. These values may then be plugged in to the following equations:

$$Q[R]=val/M^2$$

$$Q[G]=(val-Q[R]*M^2)/M$$

$$Q[B]=val-Q[R]*M^2-Q[R]*M$$

where M is the number of representative quantized indices for each color channel, to obtain the color separated quantized values for RGB, Q[R], Q[G], and Q[B]. If M is designed to be a power of two, division may be avoided. That is, for example, if M=2, then Q[R]=val/4=val>>2, where >> is the right shift operator.

FIG. 12 is a table illustrating numerical examples of a codebook stored in a look up table. Here, the table includes a range for the entropy encoding index shown as entropy encoding index range, and an example of a code word for each corresponding entropy encoding index, provided as a bitstream including a prefix and a suffix. It is noted that the code words shown in FIG. 12 is merely an example set of code words and in practice, other code words may be used. In this example, there are 8 representative levels. For example, entropy encoding index numbers 0-3 are in the first level, 4-11 are in the second level, 12-27 are in the third level, 28-59 are in the fourth level, 60-123 are in the fifth level, 124-251 are in the sixth level, 252-507 are in the seventh level, and 508-511 are in the eighth level, wherein the binary code words increase in length as the sorted entropy encoding index value increases. Each prefix in the table designates a level and each suffix indicates a position within the corresponding level. As prefix length increases (e.g., level increases) suffix length increases. In the illustrated example, the suffix corresponds to position −1. Entropy encoding index 3 is in a first level that includes indices 0-3. The prefix for this level is 0 and entropy encoding index 3 is in the 4$^{th}$ position of the level. Accordingly, the suffix is 3 base ten. The suffix length for the level is 2 so the suffix is 11. Accordingly, the binary code word for entropy encoding index 3 according to the table in FIG. 12 is 011.

Here, the higher entropy encoding index values correspond to the lower frequency of occurrence of the patterns, and the lower entropy encoding index values correspond to the higher frequency of occurrence of the patterns. As described above, entropy encoding indices may be stored in an array idxArray that is arranged (e.g., indexed) based on pattern values. Therefore, idxArray[patternValue] is equal to a entropy encoding index for patternValue. In an example where M=8, idxArray[512]={0, 448, 64, 8, 56, 1, 7, 384, 504, 72, 128, 120, 456, 63, 9, 320, 65, 192, 455, 73, 511, 256, 449, 57, 15, 71, 2, 440, 79, 136, 16, 127, 48, 463, 505, 6, 457, 121, 376, 447, 137, 200, 369, 10, 365, 219, 312, 319, 383, 129,184, 58, 385, 391, 62, 392, 3, 74, 496, 264, 80, 23, 135, 55, 112, 87, 49, 374, 66, 201, 464, 17, 450, 433, 24, 441, 503, 143, 454, 40, 510, 13, 14, 193, 81, 248, 265, 250, 375, 255, 327, 458, 205, 5, 185, 278, 54, 399, 439, 393, 32, 202, 4, 70, 328, 191, 257, 321, 151, 277, 138, 145, 249, 186, 311, 78, 497, 11, 22, 144, 488, 126, 119, 214, 502, 113, 438, 150, 465, 377, 310, 86, 432, 471, 146, 199, 130, 335, 329, 122, 386, 176, 400, 194, 269, 209, 263, 266, 203, 207, 462, 82, 141, 25, 88, 271, 267, 472, 104, 424, 213, 330, 342, 208, 506, 61, 12, 292, 210, 394, 142, 215, 41, 47, 446,77, 18, 67, 96, 480, 31, 183, 272, 390, 134, 406, 305, 501, 470, 75, 337, 190, 451, 33, 322, 131, 279, 401, 39, 258,111, 50, 453, 408, 336, 59, 247, 273, 407, 313, 368, 69, 460, 461, 509, 198, 240, 195, 495, 416, 60, 68, 452, 114, 177, 26, 479, 21, 89, 398, 105, 466, 152, 489, 76, 500, 304, 168, 95, 508, 118, 382, 487, 473, 189, 343, 139, 442, 498, 387,507, 53, 160, 218, 334, 103, 97, 459, 481, 314, 323, 326, 125, 246, 318, 83, 206, 431, 270, 46, 254, 123, 30, 341, 232,153, 352, 217, 34, 42, 367, 149, 378, 344, 268, 133, 19, 262, 360, 241, 94, 437, 415, 388, 51, 90, 175, 124, 445, 169, 402, 159, 216, 85, 309, 425, 389, 409, 224, 20, 423, 182, 52, 181, 428, 140, 494, 38, 434, 154, 161, 345, 178, 303, 296, 204, 499, 35, 187, 147, 474, 366, 338, 467, 167, 417, 373, 491, 117, 132, 84, 245, 478, 395, 429, 280, 27, 492, 410, 430,355, 490, 443, 281, 239, 333, 397, 102, 110, 486, 106, 331, 274, 469, 115, 288, 98, 324, 302, 444, 332, 482, 43, 238, 346, 223, 44, 287, 359, 361, 259, 45, 282, 29, 225, 396, 158, 116, 295, 231, 197, 148, 174, 188, 242, 289, 351, 468, 196, 28, 426, 325, 353, 233, 436, 261, 493, 170, 381, 427, 91, 435, 297, 306, 253, 414, 155, 370, 222, 37, 36, 422, 294, 485, 379, 419, 477, 211, 418, 354, 317, 166, 179, 162, 347, 107, 405, 230, 483, 251, 476, 315, 380, 362, 92, 252, 290, 156, 157, 411, 403, 108, 93, 260, 180, 226, 301, 235, 234, 475, 364, 298, 484, 99, 243, 316, 358, 109, 237, 404, 221, 165, 229, 275, 286,307, 350, 308, 101, 163, 227, 421, 363, 171, 172, 283, 372, 299, 244, 100, 357, 173, 164, 420, 371, 339, 356, 293, 228, 412, 276, 220, 291, 340, 212, 413, 236, 348, 284, 300, 285, 349}. Based on this idxArray, pattern value 0 corresponds to entropy encoding index 0 (e.g., idxArray [0]=0), which corresponds to entropy encoding index range [0, 3], prefix 0 and suffix 00. Thus, the code word for pattern value 0 is 000. Similarly, pattern value 2 corresponds to entropy encoding index 64 (e.g., idxArray [2]=64), which corresponds to entropy coding index range [60, 123], which correspond to prefix 11110 and suffix 000100. Therefore, the code word for pattern value 2 may be 11110000100. Accordingly, by mapping entropy encoding indices to the look up table of FIG. 12, the entropy encoder is able to encode the quantized triplet color values to a binary code word.

Alternatively, the S array for the above example may be S={0, 448, 64, 8, 56, 1, 7, 384, 504, 72, 128, 120, 456, 63, 9, 320, 65, 192, 455, 73, 511, 256, 449, 57, 15, 71, 2, 440, 79, 136, 16, 127, 48, 463, 505, 6, 457, 121, 376, 447, 137, 200, 369, 10, 365, 219, 312, 319, 383, 129,184, 58, 385, 391, 62, 392, 3, 74, 496, 264, 80, 23, 135, 55, 112, 87, 49, 374, 66, 201, 464, 17, 450, 433, 24, 441, 503, 143, 454, 40, 510, 13, 14, 193, 81, 248, 265, 250, 375, 255, 327, 458, 205, 5, 185, 278, 54, 399, 439, 393, 32, 202, 4, 70, 328, 191, 257, 321, 151, 277, 138, 145, 249, 186, 311, 78, 497, 11, 22, 144, 488, 126, 119, 214, 502, 113, 438, 150, 465, 377, 310, 86, 432, 471, 146, 199, 130, 335, 329, 122, 386, 176, 400, 194, 269, 209, 263, 266, 203, 207, 462, 82, 141, 25, 88, 271, 267, 472, 104, 424, 213, 330, 342, 208, 506, 61, 12, 292, 210, 394, 142, 215, 41, 47, 446,77, 18, 67, 96, 480, 31, 183, 272, 390, 134, 406, 305, 501, 470, 75, 337, 190, 451, 33, 322, 131, 279, 401, 39, 258,111, 50, 453, 408, 336, 59, 247, 273, 407, 313, 368, 69, 460, 461, 509, 198, 240, 195, 495, 416, 60, 68, 452, 114, 177, 26, 479, 21, 89, 398, 105, 466, 152, 489, 76, 500, 304, 168, 95, 508, 118, 382, 487, 473, 189, 343, 139, 442, 498, 387,507, 53, 160, 218, 334, 103, 97, 459, 481, 314, 323, 326, 125, 246, 318, 83, 206, 431, 270, 46, 254, 123, 30, 341, 232,153, 352, 217, 34, 42, 367, 149, 378, 344, 268, 133, 19, 262, 360, 241, 94, 437, 415, 388, 51, 90, 175, 124, 445, 169, 402, 159, 216, 85, 309, 425, 389, 409, 224, 20, 423, 182, 52, 181, 428, 140, 494, 38, 434, 154, 161, 345, 178, 303, 296, 204, 499, 35, 187, 147, 474, 366, 338, 467, 167, 417, 373, 491, 117, 132, 84, 245, 478, 395, 429, 280, 27, 492, 410, 430,355, 490, 443, 281, 239, 333, 397, 102, 110, 486, 106, 331, 274, 469, 115, 288, 98, 324, 302, 444, 332, 482, 43, 238, 346, 223, 44, 287, 359, 361, 259, 45, 282, 29, 225, 396, 158, 116, 295, 231, 197, 148, 174, 188, 242, 289, 351, 468, 196, 28, 426, 325, 353, 233, 436, 261, 493, 170, 381, 427, 91, 435, 297, 306, 253, 414, 155, 370, 222, 37, 36, 422, 294, 485, 379, 419, 477, 211, 418, 354, 317, 166, 179, 162, 347, 107, 405, 230, 483, 251, 476, 315, 380, 362, 92, 252, 290, 156, 157, 411, 403, 108, 93, 260, 180, 226, 301, 235, 234, 475, 364, 298, 484, 99, 243, 316, 358, 109, 237, 404, 221, 165, 229, 275, 286,307, 350, 308, 101, 163, 227, 421, 363, 171, 172, 283, 372, 299, 244, 100, 357, 173, 164, 420, 371, 339, 356, 293, 228, 412, 276, 220, 291, 340, 212, 413, 236, 348, 284, 300, 285, 349}.

Based on this S array, pattern value 0 corresponds to entropy encoding index 0 (e.g., S [0]=0), which corresponds to entropy coding index range [0, 3], prefix 0 and suffix 00. Thus, the code word for pattern value 0 is 000. Similarly, pattern value 2 corresponds to entropy encoding index 64 (e.g., S [64]=2), which corresponds to entropy coding index range [60, 123], which correspond to prefix 11110 and suffix 000100. Therefore, the code word for pattern value 2 may be 11110000100. Accordingly, by mapping entropy encoding indices to the look up table of FIG. 12, the entropy encoder is able to encode the quantized triplet color values to a binary code word.

In some embodiments, during decoding, the decoder looks for a first zero in the prefix of the code word. Based on the number of ones that appear before the zero, the decoder is able to determine the range of entropy encoding index numbers. For example, if the prefix is 110, then the decoder is able to determine that the entropy encoding index is in the 12-27 range. Similarly, if the prefix is 1110, then the decoder is able to determine that the entropy encoding index is in the 28-59 range. Accordingly, the length of the suffix may be determined based on the length of the prefix. In other words, if the prefix is longer, then the suffix may be longer. Next, the decoder looks at the numbers following the zero, which is the suffix. If all of the suffix numbers are zeros, then the entropy encoding index value is the first entropy encoding index number in that entropy encoding index range. Thus, for example, if the decoder has determined that the entropy encoding index range is 12-27 because the prefix is 110, and the suffix is all zeros, e.g., 0000, then the decoder is able to determine that the index value is 12, which is the first entropy encoding index value in the range 12-27. If the suffix is 0001, then the index value is 13, whereas if the suffix is 0010, then the entropy encoding index value is 14, and so on. Thus, if the suffix is all ones, e.g., 1111, then the entropy encoding index is the last entropy encoding index value the range 12-27, which is entropy encoding index value 27.

According to some embodiments, the entropy encoding index range 508-511 is a special case, where the prefix does not include any zeros. Thus, the decoder may be set to look for a threshold number of ones, e.g., seven ones in this example. Thus, if the decoder determines that there are seven ones in the prefix, then the decoder is able to determine that the entropy encoding index range is 508-511. Here, the suffix is determined in a similar fashion where all zeros indicates the first entropy encoding index value of the entropy encoding index range 508-511. Accordingly, the example table of FIG. 7 utilizes a mixture of Golomb-Rice and Exponential-Golomb code. Here, the Golomb-Rice code is used when the prefix length is 1 and uses Exponential-Golomb code for when the prefix length is greater than 1. However, the use of Golomb-Rice codes or Exponential-Golomb codes are examples only and in practice, other entropy coding methods may be used instead and/or in combination with various entropy coding methods.

FIG. 13 is a table illustrating a look up table mapping entropy encoding indices to code words for pixels having an RGBG format (e.g., PENTILE® format). When the pixel is in an RGBG format, the same approach as the method discussed with reference to the pixel in an RGB format may be used. However, when each quantized color indices is represented by 8 levels (e.g., M=8 levels), i.e., red, green, blue, and green, 4096 entropy encoding indices are possible. Therefore, creating 4096 entropy encoding indices in a look up table may be expensive and resource consuming. In order to conserve memory space in the look up table, the entropy encoding indices may be split into two sets of 64 entropy encoding index arrays. That is, by splitting RGBG to pairs, for example, RB and GG, each pair of RB and GG includes just 64 entropy encoding indices which is substantially less than 4096 entropy encoding indices. Accordingly, the following equations may be used:

$$index_{rb} = idxArray_{RB}[8*Q[B]+Q[R]]$$

$$index_g = idxArray_G[8*Q[G_1]+Q[G_0]]$$

which results in the following entropy encoding index arrays:

$idxArray_{RB}$={0, 4, 15, 27, 62, 33, 16, 3, 2, 6, 13, 23, 48, 53, 36, 8, 11, 9, 17, 31, 52, 59, 37, 29, 22, 18, 25, 35, 51, 56, 49, 44, 46, 38, 43, 60, 58, 45, 40, 41, 24, 42, 54, 61, 55, 34, 21, 20, 12, 28, 39, 57, 50, 30, 19, 10, 1, 7, 32, 47, 63, 26, 14, 5}, and $idxArray_G$={0, 4, 13, 9, 30, 10, 16, 1, 2, 8, 21, 28, 44, 35, 18, 6, 15, 24, 38, 52, 57, 42, 23, 17, 12, 47, 58, 63, 49, 25, 36, 33, 32, 48, 61, 62, 46, 50, 53, 41, 11, 37, 55, 31, 60, 56, 43, 29, 14, 20, 27, 51, 59, 54, 39, 22, 3, 5, 19, 34, 40, 45, 26, 7}

As can be seen, the entropy encoding indices are different for the two sets of arrays. Therefore, when encoding red and blue, the RB array is used and when encoding green, the G array is used.

The corresponding S (sorted) arrays of pattern values for this example may be:

$S_{RB}$={0, 56, 8, 7, 1, 63, 9, 57, 15, 17, 55, 16, 48, 10, 62, 2, 6, 18, 25, 54, 47, 46, 24, 11, 40, 26, 61, 3, 49, 23, 53, 19, 58, 5, 45, 27, 14, 22, 33, 50, 38, 39, 41, 34, 31, 37, 32, 59, 12, 30, 52, 28, 20, 13, 42, 44, 29, 51, 36, 21, 35, 43, 4, 60}, and $S_G$={0, 7, 8, 56, 1, 57, 15, 63, 9, 3, 5, 40, 24, 2, 48, 16, 6, 23, 14, 58, 49, 10, 55, 22, 17, 29, 62, 50, 11, 47, 4, 43, 32, 31, 59, 13, 30, 41, 18, 54, 60, 39, 21, 46, 12, 61, 36, 25, 33, 28, 37, 51, 19, 38, 53, 42, 45, 20, 26, 52, 44, 34, 35, 27}.

Figure 14:
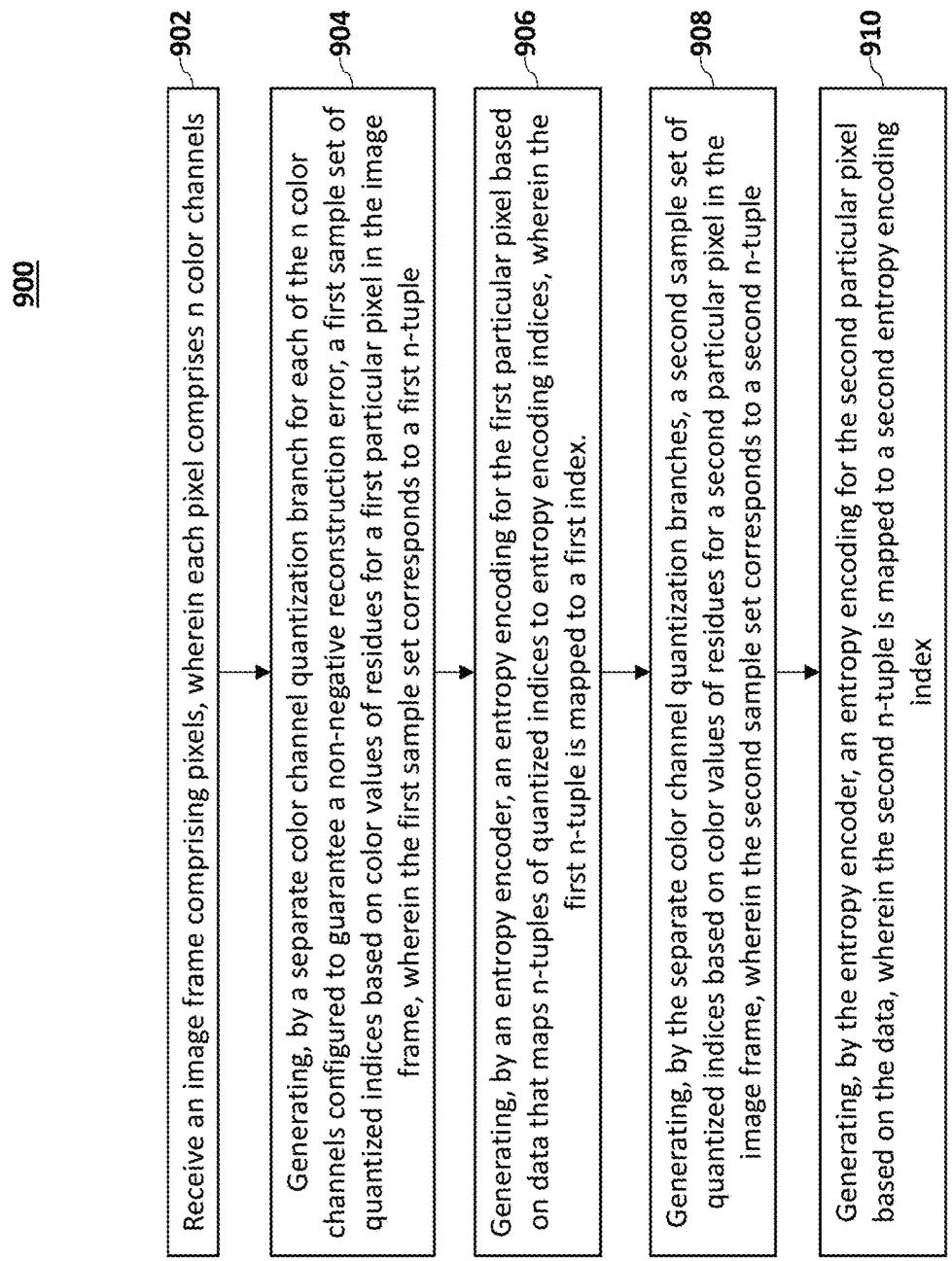
FIG. 14-16 are flow charts illustrating example methods for performing joint color channel entropy encoding, according to various embodiments of the present disclosure.

FIG. 14 is a flow chart illustrating an example method for performing joint color channel entropy encoding, according to an embodiment of the present disclosure. Assuming that the encoder is already trained and has stored thereon an array S in a look up table, the encoder receives an image frame. The image frame is made up of pixels and each pixel includes n color channels, such as, for example, a red color channel, a green color channel, and a blue color channel. (902). Next, the image frame is encoded by a separate color channel encoding process via a separate color channel quantization branch that guarantees a non-negative reconstruction error for each of the n color channels. The encoder further generates a first sample set of quantized color indices based on color values of residues for a first particular pixel in the image frame. Here, the first sample set corresponds to a first n-tuple of the color channels (904). Next, an entropy encoder generates entropy encoding for the first particular pixel based on data that maps n-tuples of quantized indices to entropy encoding indices. Here, the first n-tuple is mapped to a first entropy encoding index (906).

In some embodiments, each of the separate color channel quantization branches generates a second sample set of quantized color values based on color values of residues for a second particular pixel in the image frame. Here, the second sample set corresponds to a second n-tuple (908). Next, the entropy encoder generates an entropy encoding for the second particular pixel based on the data, wherein the second n-tuple is mapped to a second entropy encoding index (910). Accordingly, a received image frame may be encoded by exploiting the inter-channel correlation of the colors of the image frame in a joint color channel entropy encoding technique while maintaining a non-negative reconstruction error. It is noted that in some embodiments, the joint color channel entropy encoding technique that exploits the inter-channel correlation of color images may also be applicable in encoders and/or decoders that does not necessarily guarantee a non-negative error reconstruction. In other words, the reconstruction error may be a negative value and the joint color channel entropy encoding techniques may be utilized without departing from the scope of the embodiments described herein.

Figure 15:
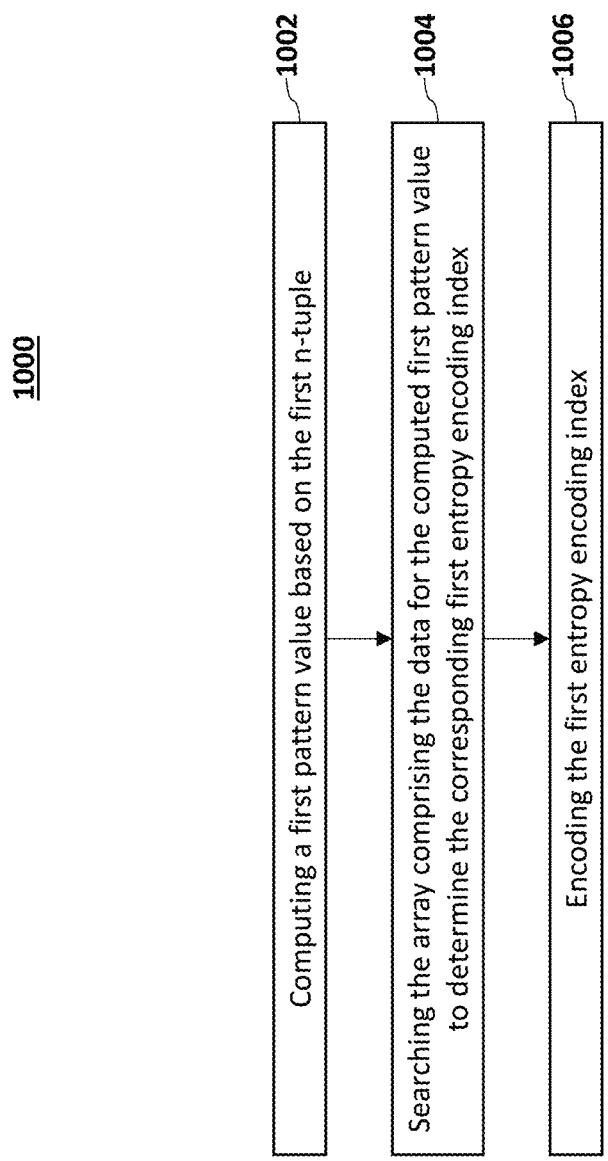

FIG. 15 is a flow chart illustrating an example method for performing joint color channel entropy encoding, according to an embodiment of the present disclosure. According to the method, a first pattern value based on the first n-tuple is computed (1002). Once the first pattern values are computed, the entropy encoder references a look up table that includes an array of data for the computed first pattern value to determine the corresponding first entropy encoding index (1004). Once the corresponding first index is determined, the first entropy encoding index is encoded (1006).

Figure 16:
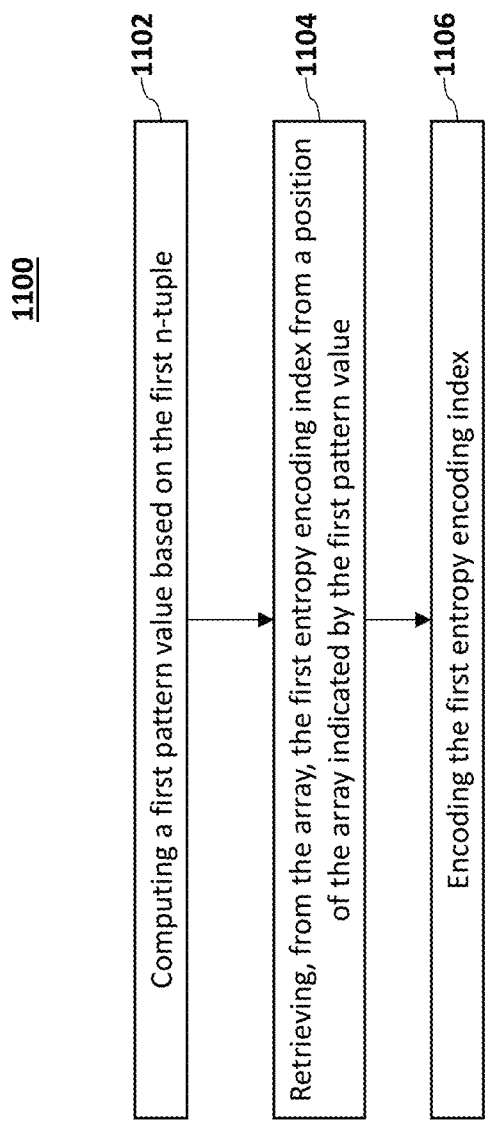

FIG. 16 is a flow chart illustrating another example method for performing joint color channel entropy encoding, according to an embodiment of the present disclosure. According to the method, a first pattern value based on the first n-tuple is computed (1102). Once the first pattern value is computed, the first entropy encoding index from a position of the array indicated by the first pattern value is retrieved from a look up table that includes the array of data. Here, the first index for a pattern value is pre-calculated when the look up table is created (1104). Thus, no additional computations are performed while determining the first index for the pattern value. Once the corresponding first index is determined, the first entropy encoding index is encoded (1104).

Figure 17:
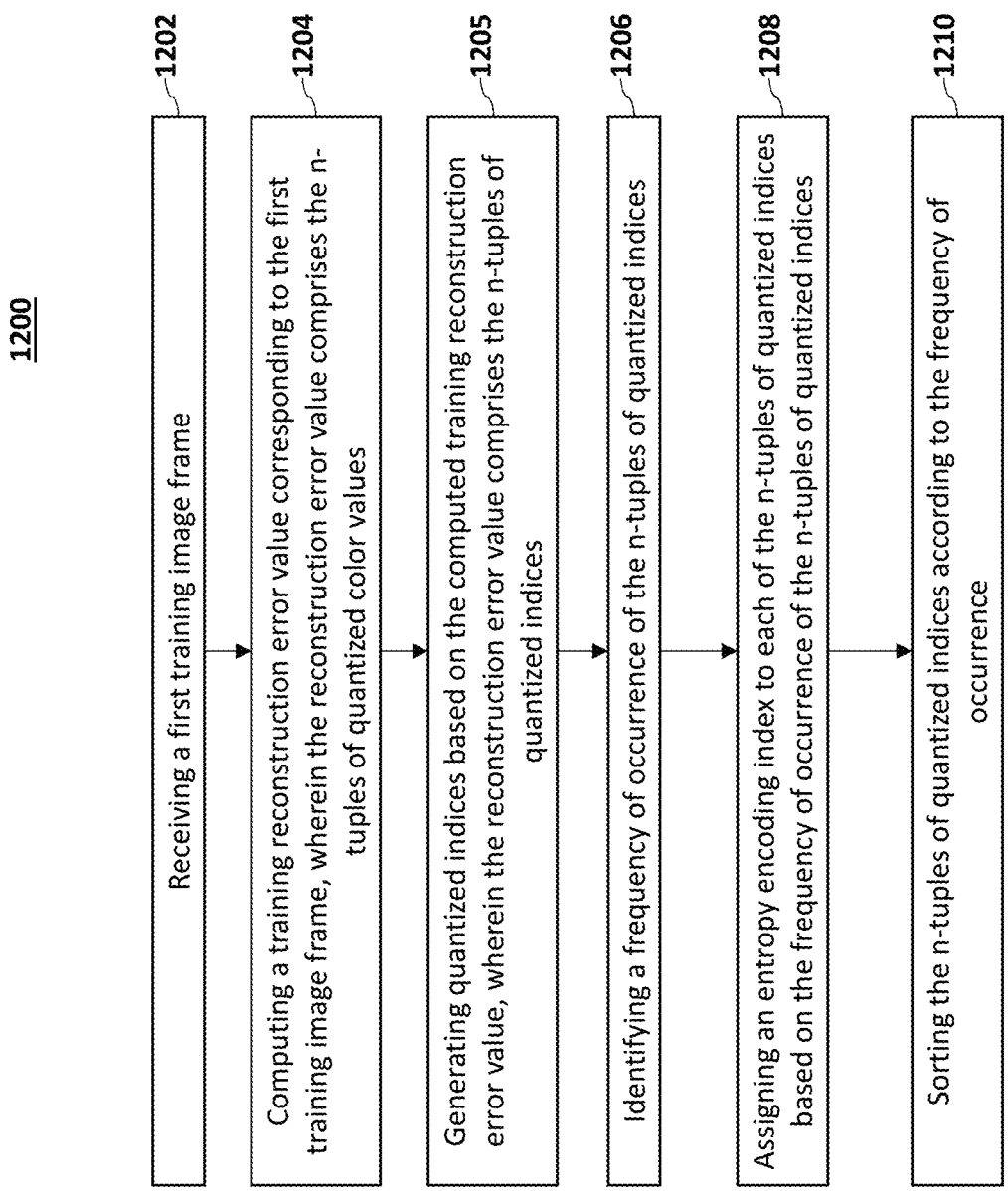
FIG. 17 is a flow chart illustrating an example method for training an encoder, according to an embodiment of the present disclosure.

FIG. 17 is a flow chart illustrating an example method for training an encoder, according to an embodiment of the present disclosure. During training, for example, in an offline process, a first training image frame is received by a training encoder (1202). Next, a training reconstruction error value corresponding to the first training image frame is computed. Here, the reconstruction error value includes n-tuples of quantized color values (1204). In some embodiments, n corresponds to the number of color channels, and therefore, in an RGB format example, n=3. Next, quantized indices based on the computed training reconstruction error value are generated (1205). Next, a frequency of occurrence for each of the n-tuples of quantized indices is identified (1206). Once the frequency of occurrence is identified for each of the n-tuples of quantized color values, an entropy encoding index is assigned to each one of the n-tuples of quantized indices according to the frequency of occurrence of the n-tuples (1208). Next, the n-tuples of quantized indices are sorted according to the frequency of occurrence (1210).

Figure 18:
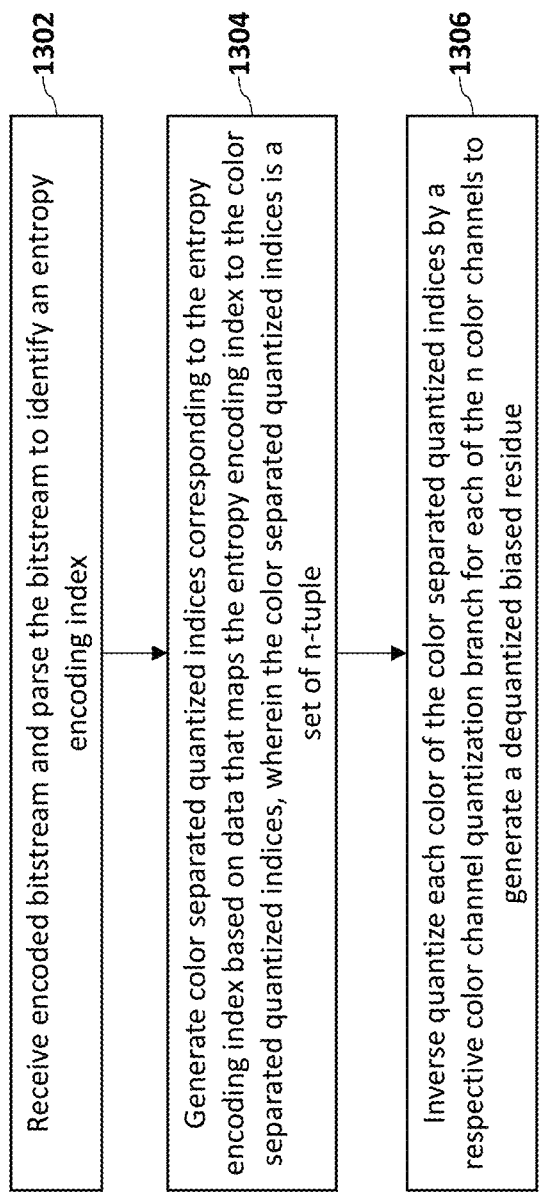
FIG. 18 is a flow chart illustrating an example method for decoding the entropy encoded indices, according to various embodiments of the present disclosure.

FIG. 18 is a flow chart illustrating an example method for decoding the entropy encoded indices, according to an embodiment of the present disclosure. After the bits are encoded, the encoder may provide the encoded bits as a bitstream to the decoder for decoding. Accordingly, the decoder may first receive the encoded bitstream and then parse the bitstream to identify an entropy encoding index (1302). Next, color separated quantized indices corresponding to the entropy encoding index is generated based on data that maps the entropy encoding index to the color separated quantized indices. In some embodiments, a look up table may be referenced to retrieve this mapping data. Here, the color separate quantized indices are a set of n-tuple (1304). Next, each color of the color separated quantized indices may be inverse quantized by a respective color channel quantization branch of each of the n color channels to generate a dequantized biased residue (1306).

Accordingly, an encoder may be trained offline, for example, during a manufacturing or fabrication of the encoder, and therefore the look up tables may be hard-coded in to a storage medium, e.g., a memory. Additionally, one or more methods described according to various embodiments throughout the present disclosure may be implemented and performed by an image compression and storage system, which may be part of a frame compensation system illustrated in the figures through the present disclosure or other related systems. For example, the entropy encoder 450 illustrated in FIG. 7 may be implemented in an encoder such as encoder 400 or other types of encoders known to those skilled in the art.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively.

The electronic or electric devices and/or any other relevant devices or components according to embodiments of the present invention described herein may be implemented utilizing any suitable hardware, firmware (e.g. an application-specific integrated circuit), software, or a combination of software, firmware, and/or hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present invention.

The operations performed by the constituent components of the encoder and the decoder may be performed by a "processing circuit" or "processor" that may include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example, a processing circuit may include two processing circuits, an FPGA and a CPU, interconnected on a PWB.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments described herein are examples only. One skilled in the art may recognize various alternative embodiments from those specifically disclosed. Those alternative embodiments are also intended to be within the scope of this disclosure. As such, the embodiments are limited only by the following claims and their equivalents.

What is claimed is:

1. A method comprising:
   receiving an image frame comprising pixels, wherein each of the pixels comprises n color channels, each color channel pixel of the n color channels comprising inter-channel correlation with one another;
   generating, by a separate color channel quantization branch for each of the n color channels configured to guarantee a reconstruction error having a non-negative value, a first sample set of quantized indices based on color values of residues for a first particular pixel in the image frame, wherein each quantized index for the separate color channel quantization branch of the first sample set of the quantized indices comprises the inter-channel correlation with one another, and wherein the first sample set corresponds to a first n-tuple; and
   generating, by an entropy encoder, an entropy encoding for the first particular pixel based on the inter-channel correlation of the pixel that is carried over to the inter-channel correlation of the quantized indices and data from each of the separate color channel quantization branches that maps n-tuples of the first sample set of the quantized indices to entropy encoding indices, wherein the first n-tuple is mapped to a first entropy encoding index.

2. The method of claim 1, wherein the generating the first sample set of the quantized indices comprises computing the residue by each of the separate color channel quantization branch by subtracting a prediction based on a previous reconstructed pixel from the received image frame.

3. The method of claim 2, wherein the generating the first sample set of the quantized indices further comprises quantizing, by a quantizer corresponding to each of the separate color channel quantization branch for the computed residue corresponding to the same color channel quantization branch to generate the first sample set of the quantized indices.

4. The method of claim 1,
   wherein each n-tuple of the first sample set of the quantized indices is associated with a frequency of occurrence of the corresponding n-tuple in a set of quantized training images, and
   wherein each n-tuple comprises quantized color indices for the n color channels, wherein the n is greater than 1.

5. The method of claim 4, further comprising:
   generating, by the separate color channel quantization branches, a second sample set of quantized indices based on color values of residues for a second particular pixel in the image frame, wherein the second sample set corresponds to a second n-tuple; and
   generating, by the entropy encoder, an entropy encoding for the second particular pixel based on the data, wherein the second n-tuple is mapped to a second entropy encoding index.

6. The method of claim 5, wherein the second particular pixel is a neighboring pixel relative to the first particular pixel in the image frame.

7. The method of claim 5, wherein the entropy encoding comprises an Exponential-Golomb encoding, a Golomb-Rice encoding, a Huffman encoding, or a combination of Exponential-Golomb and Golomb-Rice encoding.

8. The method of claim 1, wherein the data is stored as an array.

9. The method of claim 8, wherein the generating the entropy encoding further comprises:
   computing a first pattern value based on the first n-tuple;
   searching the array comprising the data for the computed first pattern value to determine the corresponding first entropy encoding index; and
   encoding the first entropy encoding index.

10. The method of claim 8, wherein the generating the entropy encoding further comprises:
    computing a first pattern value based on the first n-tuple;
    retrieving, from the array, the first entropy encoding index from a position of the array indicated by the first pattern value; and
    encoding the first entropy encoding index.

11. The method of claim 1, wherein the data that maps the n-tuples of the first sample set of the quantized indices to entropy encoding indices is generated by:
    receiving a first training image frame;
    computing a training reconstruction error value corresponding to the first training image frame;
    generating the first sample set of the quantized indices based on the computed training reconstruction error value, wherein the reconstruction error value comprises the n-tuples of the first sample set of the quantized indices;
    identifying a frequency of occurrence of the n-tuples of the first sample set of the quantized indices; and
    assigning an entropy encoding index to each of the n-tuples of the first sample set of the quantized indices based on the frequency of occurrence of the n-tuples of quantized indices.

12. The method of claim 11, further comprising sorting the n-tuples of the first sample set of the quantized indices according to the frequency of occurrence.

13. The method of claim 11, wherein the data that maps the n-tuples of the first sample set of the quantized indices to entropy encoding indices is performed during an offline process.

14. An encoder comprising:
- n separate color channel quantization branches configured to generate n-tuples of quantized indices, each of the branches corresponding to one of n color channels of a pixel of an image frame, wherein each color channel pixel of the n color channels comprises inter-channel correlation with one another, and each of the quantized indices for the separate color channel quantization branches comprises the inter-channel correlation with one another;
- an entropy encoder configured to receive the n-tuples of the quantized indices from each of the separate color channel quantization branches and configured to entropy encode the n-tuples of the quantized indices based on the inter-channel correlation of the pixel that is carried over to the inter-channel correlation of the quantized indices and data that maps the n-tuples of the quantized indices inter-channel correlated with one another to entropy encoding indices; and
- wherein each of the n color channel quantization branches are configured to guarantee a reconstruction error having a non-negative value, wherein the n is greater than 1.

15. The encoder of claim 14, wherein each n-tuple of the quantized indices is associated with a frequency of occurrence of a corresponding n-tuple in a set of quantized training images.

16. The encoder of claim 14, wherein each n-tuple comprises the quantized indices for the n color channels.

17. The encoder of claim 16, wherein the data is stored as an array.

18. The encoder of claim 16, wherein the entropy encoding comprises an Exponential-Golomb encoding, a Golomb-Rice encoding, a Huffman encoding, or a combination of Exponential-Golomb and Golomb-Rice encoding.

19. An image compression and storage system, comprising:
- a memory storing computer-executable instructions; and
- a processor configured to execute the instructions and causes the system to perform operations comprising:
    - receiving an image frame comprising pixels, wherein each of the pixels comprises n color channels, each color channel pixel of the n color channels comprising inter-channel correlation with one another;
    - generating, by a separate color channel quantization branch for each of the n color channels configured to guarantee a reconstruction error having a non-negative value, a first sample set of quantized indices based on color values of residues for a first particular pixel in the image frame, wherein each quantized index for the separate color channel quantization branch of the first sample set of the quantized indices comprises the inter-channel correlation with one another, and wherein the first sample set corresponds to a first n-tuple;
    - generating, by an entropy encoder, an entropy encoding for the first particular pixel based on the inter-channel correlation of the pixel that is carried over to the inter-channel correlation of the quantized indices and data from each of the separate color channel quantization branches that maps n-tuples of the first sample set of the quantized indices to entropy encoding indices, wherein the first n-tuple is mapped to a first entropy encoding index;
    - wherein each n-tuple of the first sample set of the quantized indices is associated with a frequency of occurrence of the corresponding n-tuple in a set of quantized training images; and
    - wherein each n-tuple comprises the first sample set of the quantized indices for the n color channels, wherein the n is greater than 1.

20. The system of claim 19, wherein the instructions further causes the system to perform operations comprising:
- generating, by the separate color channel quantization branches, a second sample set of quantized indices based on color values of residues for a second particular pixel in the image frame, wherein the second sample set corresponds to a second n-tuple; and
- generating, by the entropy encoder, an entropy encoding for the second particular pixel based on the data, wherein the second n-tuple is mapped to a second entropy encoding index.

* * * * *